United States Patent
Nix et al.

(10) Patent No.: US 9,350,767 B2
(45) Date of Patent: May 24, 2016

(54) PACKET-SWITCHED TELEPHONY CALL SERVER

(75) Inventors: John A. Nix, Chicago, IL (US); Jeffrey S. Mumma, Chicago, IL (US)

(73) Assignee: Skype Limited, Dublin (IE)

( * ) Notice: Subject to any disclaimer, the term of this patent is extended or adjusted under 35 U.S.C. 154(b) by 60 days.

(21) Appl. No.: 13/168,578

(22) Filed: Jun. 24, 2011
(Under 37 CFR 1.47)

(65) Prior Publication Data

US 2011/0255532 A1    Oct. 20, 2011

(51) Int. Cl.
| | | |
|---|---|---|
| H04L 12/50 | (2006.01) | |
| H04J 3/16 | (2006.01) | |
| H04J 3/22 | (2006.01) | |
| H04L 29/06 | (2006.01) | |
| H04M 7/12 | (2006.01) | |
| H04L 12/54 | (2013.01) | |
| H04L 12/66 | (2006.01) | |

(52) U.S. Cl.
CPC .......... *H04L 65/1069* (2013.01); *H04M 7/126* (2013.01); *H04L 12/56* (2013.01); *H04L 12/66* (2013.01); *H04L 29/06027* (2013.01)

(58) Field of Classification Search
USPC .................................................. 370/385, 466
See application file for complete search history.

(56) References Cited

U.S. PATENT DOCUMENTS

| | | | |
|---|---|---|---|
| 5,579,376 A | 11/1996 | Kennedy et al. | |
| 5,850,433 A | 12/1998 | Rondeau | |
| 5,943,412 A * | 8/1999 | Courvoisier | 379/211.02 |
| 5,966,387 A | 10/1999 | Cloutier | |
| 6,014,440 A | 1/2000 | Melkild et al. | |
| 6,026,290 A | 2/2000 | Lamkin et al. | |
| 6,049,565 A | 4/2000 | Paradine et al. | |
| 6,064,653 A * | 5/2000 | Farris | 370/237 |
| 6,158,010 A | 12/2000 | Moriconi et al. | |
| 6,161,201 A * | 12/2000 | Payne et al. | 714/43 |
| 6,201,805 B1 | 3/2001 | Strathmeyer | |
| 6,216,111 B1 * | 4/2001 | Walker et al. | 705/14.13 |
| 6,282,275 B1 | 8/2001 | Gurbani et al. | |
| 6,339,594 B1 | 1/2002 | Civanlar et al. | |
| 6,360,366 B1 | 3/2002 | Heath et al. | |
| 6,373,930 B1 * | 4/2002 | McConnell et al. | 379/114.28 |
| 6,490,275 B1 | 12/2002 | Sengodan | |
| 6,584,093 B1 | 6/2003 | Salama et al. | |

(Continued)

FOREIGN PATENT DOCUMENTS

| | | |
|---|---|---|
| EP | 0 923 211 A2 | 6/1999 |
| WO | WO 00/70834 | 11/2000 |
| WO | WO 00/76107 | 12/2000 |

OTHER PUBLICATIONS

Dialpad, Technology, www.dialpad.com/compay/technology.html, (Printed May 7, 2001).

(Continued)

*Primary Examiner* — Kodzovi Acolatse
(74) *Attorney, Agent, or Firm* — Tom Wong; Micky Minhas

(57) ABSTRACT

A system and method for providing packet-switched telephony service. The system provides call control, signaling, and/or delivery of voice, video, and other media in substantially real time. One embodiment of the system includes a call client application on a user device, and a call server located at a packet-switched telephony service provider. The call server is preferably operable to communicate with the call client in a non-native protocol and with the gateway in a native protocol.

47 Claims, 20 Drawing Sheets

(56) References Cited

U.S. PATENT DOCUMENTS

| | | | |
|---|---|---|---|
| 6,603,849 | B2 | 8/2003 | Lin et al. |
| 6,618,761 | B2 | 9/2003 | Munger et al. |
| 6,711,417 | B1 | 3/2004 | Gorman et al. |
| 6,738,383 | B1 | 5/2004 | Kliland et al. |
| 6,747,970 | B1 | 6/2004 | Lamb et al. |
| 6,751,652 | B1 | 6/2004 | Thomas |
| 6,775,277 | B1 | 8/2004 | Li et al. |
| 6,819,664 | B1 | 11/2004 | Jeong |
| 6,819,665 | B1 | 11/2004 | Pinard et al. |
| 6,819,667 | B1 | 11/2004 | Brusilovsky et al. |
| 6,862,267 | B1 | 3/2005 | Hughes et al. |
| 6,922,411 | B1* | 7/2005 | Taylor ............... H04M 7/006 209/239 |
| 6,968,385 | B1 | 11/2005 | Gilbert |
| 6,977,911 | B1* | 12/2005 | Geen et al. ............... 370/328 |
| 7,002,989 | B2 | 2/2006 | Agrawal et al. |
| 7,113,571 | B2* | 9/2006 | Matsubara et al. .......... 379/72 |
| 7,145,900 | B2 | 12/2006 | Nix et al. |
| 7,991,001 | B2 | 8/2011 | Nix et al. |
| 2001/0043615 | A1 | 11/2001 | Park et al. |
| 2002/0059425 | A1 | 5/2002 | Belfiore et al. |
| 2002/0064149 | A1 | 5/2002 | Elliott et al. |
| 2002/0078153 | A1* | 6/2002 | Chung et al. ............. 709/204 |
| 2002/0085587 | A1 | 7/2002 | Mascolo |
| 2002/0126654 | A1* | 9/2002 | Preston et al. ............ 370/352 |
| 2002/0129264 | A1 | 9/2002 | Rowland et al. |
| 2002/0150080 | A1 | 10/2002 | Bhattacharya et al. |
| 2002/0154755 | A1 | 10/2002 | Gourraud |
| 2003/0123466 | A1* | 7/2003 | Somekh et al. ............ 370/401 |
| 2003/0236919 | A1 | 12/2003 | Johnson et al. |
| 2005/0021761 | A1* | 1/2005 | Thomas ..................... 709/227 |
| 2006/0098619 | A1 | 5/2006 | Nix et al. |
| 2006/0274664 | A1* | 12/2006 | Pandya ..................... 370/249 |
| 2007/0127449 | A1 | 6/2007 | Nix et al. |

OTHER PUBLICATIONS

Dialpad.com Signs One Million Members in First 8 Weeks, dated Dec. 14, 1999, www.industry.java.sun.com/javanews/stories/print/0,1797,21360,00.html, (printed May 7, 2001).
Serome Technology, Introduction of DialpadWorld is First in a Series of Premium Services to be offered to Customers Worldwide, dated Feb. 13, 2000, www.serome.com/board 01/content_gen.asp?seq=310, (printed May 7, 2001).
Net2phone, How Net2phone Works, dated May 7, 2001, www.net2phone.com/net2phone/product_info/how.html, (printed May 7, 2001).
Speak Freely for Windows, Compression Modes, www.speakfreely.org/doc/compress.html, (printed Mar. 26, 2002).
Speak Freely for Windows, The Answering Machine, www.speakfreely.org/doc/answer.html, (printed Mar. 26, 2002).
Speak Freely for Windows, Communicating with Other Network Voice Programs, www.speakfreely.org/doc/protocol.html, (printed Mar. 26, 2002).
Speak Freely for Windows, Voice Activation, www.speakfreely.org/doc/vox.html, (printed Mar. 26, 2002).
Speak Freely for Windows, Viewing Extended Status, www.speakfreely.org/doc/prop.html (printed Mar. 26, 2002).
Speak Freely for Windows, Broadcasting to Multiple Sites, www.speakfreely.org/doc/broadcast.html, (printed Mar. 26, 2002).
Speak Freely for Windows, Multicasting to a Group, www.speakfreely.org/doc/multicast.html, (printed Mar. 26, 2002).
Speak Freely for Windows, Local Loopback, www.speakfreely.org/doc/loopback.html, (printed Mar. 26, 2002).
Speak Freely for Windows, Ring a Remote User, www.speakfreely.org/doc/ring.html, (printed Mar. 26, 2002).
Speak Freely for Windows, Sending Sound Files, www.speakfreely.org/doc/soundfile.html, (printed Mar. 26, 2002).
Speak Freely for Windows, Sending Live Audio, www.speakfreely.org/doc/sned.html, (printed Mar. 26, 2002).
Speak Freely for Windows, Receiving Sound, www.speakfreely.org/doc/recv.html, (printed Mar. 26, 2002).
Speak Freely for Windows, Development Log, Aug. 23, 1995-Mar. 12, 1996, www.speakfreely.org/doc/development_log.html, (printed Mar. 26, 2002).
Speak Freely for Windows, Bookshelf, www.speakfreely.org/doc/bookshelf.html, (printed Mar. 26, 2002).
Speak Freely for Windows, Why Encryption?, www.speakfreely.org/doc/crypt.html, (printed Mar. 26, 2002).
Speak Freely for Windows, Release 7.0, dated Jan. 5, 2002, www.speakfreely.org/, (printed Mar. 26, 2002).
Speak Freely for Windows, Release 7.1, dated Oct. 1999, www.fourmilab.ch/speakfree/windows/, (printed Mar. 26, 2002).
Speak Freely for Windows, Credits, www.speakfreely.org/doc/credits.html, (printed Mar. 26, 2002).
Speak Freely for Windows, Bugs, Features, and Frequently-Asked Questions, www.speakfreely.org/doc/bugs.html, (printed Mar. 26, 2002).
Speak Freely for Windows, Half-Duplex Vs. Full-Duplex, www.speakfreely.org/doc/duplex.html, (printed Mar. 26, 2002).
Speak Freely for Windows, Sampling: 8: Vs. 16 but, www.speakfreely.org/doc/sampling.html, (printed Mar. 26, 2002).
Speak Freely for Windows, Measuring Computer Performance, www.speakfreely.org/doc/bench.html, (printed Mar. 26, 2002).
Speak Freely for Windows, Viewing Hardware Configuration, www.speakfreely.org/doc/about.html, (printed Mar. 26, 2002).
Speak Freely for Windows, Workarounds for Driver Bugs, www.speakfreely.org/doc/workarounds.html, (printed Mar. 26, 2002).
Speak Freely for Windows, Problems: Compression Slows Down Connection, www.speakfreely.org/doc/probcompslow.html, (printed Mar. 26, 2002).
Speak Freely for Windows, Problems: Random Pauses in Output, www.speakfreely.org/doc/probrandpause.html, (printed Mar. 26, 2002).
Speak Freely for Windows, Problems: Regular Pauses in Output, www.speakfreely.org/doc/probregpause.html, (printed Mar. 26, 2002).
Speak Freely for Windows, Communications with Other Network Voice Programs, www.fourmilab.ch/speakfree/windows/doc/protocol.html, (printed Mar. 26, 2002).
Speak Freely History, dated Apr. 18, 1999, www.speakfreely.org/history.html (printed Mar. 26, 2002).
"Voice over IP Signaling: H.323 and Beyond", Hong Liu et al, Oct. 2000 IEEE Communications.
Wiles, et al., Speak Freely, Release 7.2 for Windows 95/98/NT/2000/ME, dated Jan. 4, 2002, www.speakfreely.org/main.html, (printed Mar. 26, 2002).
Walker, et al., Speak Freely Development Log, Aug. 23, 1995-Jun. 30, 1999, www.fourmilab.ch/, (printed Mar. 26, 2002).
International Search Report, dated Report dated Jul. 30, 2003, from counterpart International Application PCT/US02/17181.
Hamdi, L. P., et al., Voice Service Internetworking for PSTN and IP Networks, *IEEE Communications Magazine* (1999).
Hijitema, C., et al., "An Architecture for Residential Internet Telephone Service," *IEEE Network* (1999).
Anquetil, L.P, Media Gateway Control Protocol and Voice Over IP Gateways, *Alcatel Telecommunications Review* (1999).
Non-Final Office Action for U.S. Appl. No. 09/872,904; Date Mailed: Mar. 28, 2005.
Final Office Action for U.S. Appl. No. 09/872,904; Date Mailed: Dec. 30, 2005.
Notice of Allowance and Fee(s) Due for U.S. Appl. No. 09/872,904; Date Mailed: Sep. 26, 2006.
Notice of Allowance and Fee(s) Due for U.S. Appl. No. 11/593,779; Date Mailed: Mar. 24, 2011.
Non-Final Office Action for U.S. Appl. No. 11/593,779; Date Mailed: Mar. 29, 2011.
Advisory Action for U.S. Appl. No. 11/593,779; Date Mailed: Jan. 25, 2011.
Final Office Action for U.S. Appl. No. 11/593,779; Date Mailed: Nov. 11, 2010.
Non-Final Office Action for U.S. Appl. No. 11/593,779; Date Mailed: Jul. 26, 2010.

(56) References Cited

OTHER PUBLICATIONS

Final Office Action for U.S. Appl. No. 11/593,779; Date Mailed: Jan. 28, 2010.

Non-Final Office Action for U.S. Appl. No. 11/593,779; Date Mailed: Jun. 26, 2009.

Hong, L., et al., "Voice Over IP Signaling: H.323 and Beyond," *IEEE Communications*(2000).

* cited by examiner

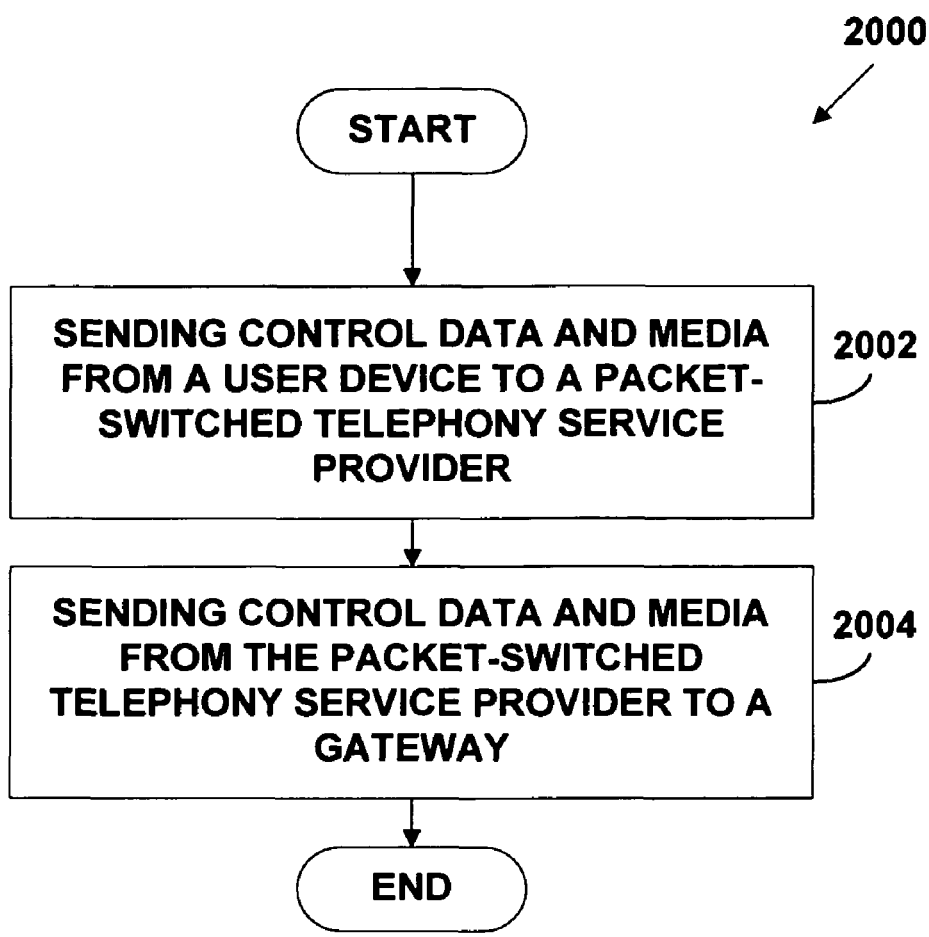

PACKET-SWITCHED TELEPHONY CALL SERVER

RELATED APPLICATIONS

This application is a continuation of U.S. application Ser. No. 11/593,779, filed Nov. 7, 2006, which is a continuation of U.S. application Ser. No. 09/872,904, filed on May 31, 2001, now U.S. Pat. No. 7,145,900. The entire teachings of the above applications are incorporated herein by reference.

FIELD

The present invention relates to telecommunications over packet-switched networks. More particularly, the present invention relates to a call server for use on a packet-switched network.

BACKGROUND

Public packet-switched networks have recently supported voice communications. "Internet telephony" is one example of packet-switched telephony. In packet-switched telephony, a packet-switched network, such as the Internet, serves as a transportation medium for packets carrying voice data. Voice-over-Internet-Protocol (VoIP) is one example of a collection of standards and protocols used to support voice communications over packet-switched networks such as the Internet. Others have been developed as well. A common Internet telephony scheme involves a computer or other device that is capable of connecting to the Internet. A gateway from the Internet to the Public-Switched Telephone Network (PSTN) allows a user of the computer to communicate through the Internet and PSTN to a telephone subscriber at a telephone connected to the PSTN. Other configurations are also possible.

Numerous benefits may be realized through the use of packet-switched telephony. For example, calls may be less expensive because of the utilization of a packet-switched network, such as the Internet, to traverse distances around the world. This is in contrast to conventional telephone service, which typically involves tying up telephone circuits to connect calls. Thus, a user in one location may communicate with a telephone subscriber at a second location by transmitting voice data across the Internet to a gateway that is located near a telephone subscriber's location, in order to avoid paying some or all of the long distance fees that might otherwise be associated with making such a call. Another possible advantage of packet-switched telephony service is the convenient interfaces and features that may be offered in a packet-switched telephony system. For example, volume control, a video session, or an address book application may be implemented. Many Internet Telephony Service Providers (ITSPs) have been formed in order to provide these services. Examples of ITSPs include Go2Call.com, Net2Phone, DialPad, Maxcall, AccessPower, and others. Each ITSP generally has its own calling rate and fee structure and may require a download of client software.

The download requirements vary by ITSP, but in general they require an application, such as a Java applet, and telephony gateway protocol software to be downloaded onto the device that will be interfacing with the Internet. The Java applet contains a dialing application can be used by a device equipped with a Java-capable browser, such as Internet Explorer and Netscape.

Several Internet telephony gateway protocols are available, including H.323, Session Initiation Protocol (SIP), and Media Gateway Control Protocol (MGCP). International Telecommunications Union standard H.323 is the current standard for transmitting voice over the Internet. One of the limitations of using H.323 is its large size. Downloading an H.323 stack can take up to ten minutes depending on a user's modem speed.

It is common for protocol standards to evolve quickly. As the protocol standards change, the user must typically download an application supporting the new version of the standard, in order to be able to complete an Internet call. The user will be delayed in placing their Internet call for the time it takes to download the latest version of the telephony gateway protocol. This is an inconvenience to the user and a potential lost subscriber to the ITSP.

A user may also wish to access the Internet using a handheld device or a cellular phone. Memory in these devices is typically more limited than in personal computers. As a result, large downloads may cause memory problems, or may even be impossible. As the world becomes more mobile, the use of these devices will likely increase, which will likely further the demand for Internet telephony.

BRIEF DESCRIPTION OF THE DRAWINGS

Various embodiments are described with reference to the following drawings, wherein:

FIG. 20 is a simplified flow diagram illustrating an exemplary method for providing packet-switched telephony service.

DETAILED DESCRIPTION

I. Packet-Switched Telephony

Figure 1:
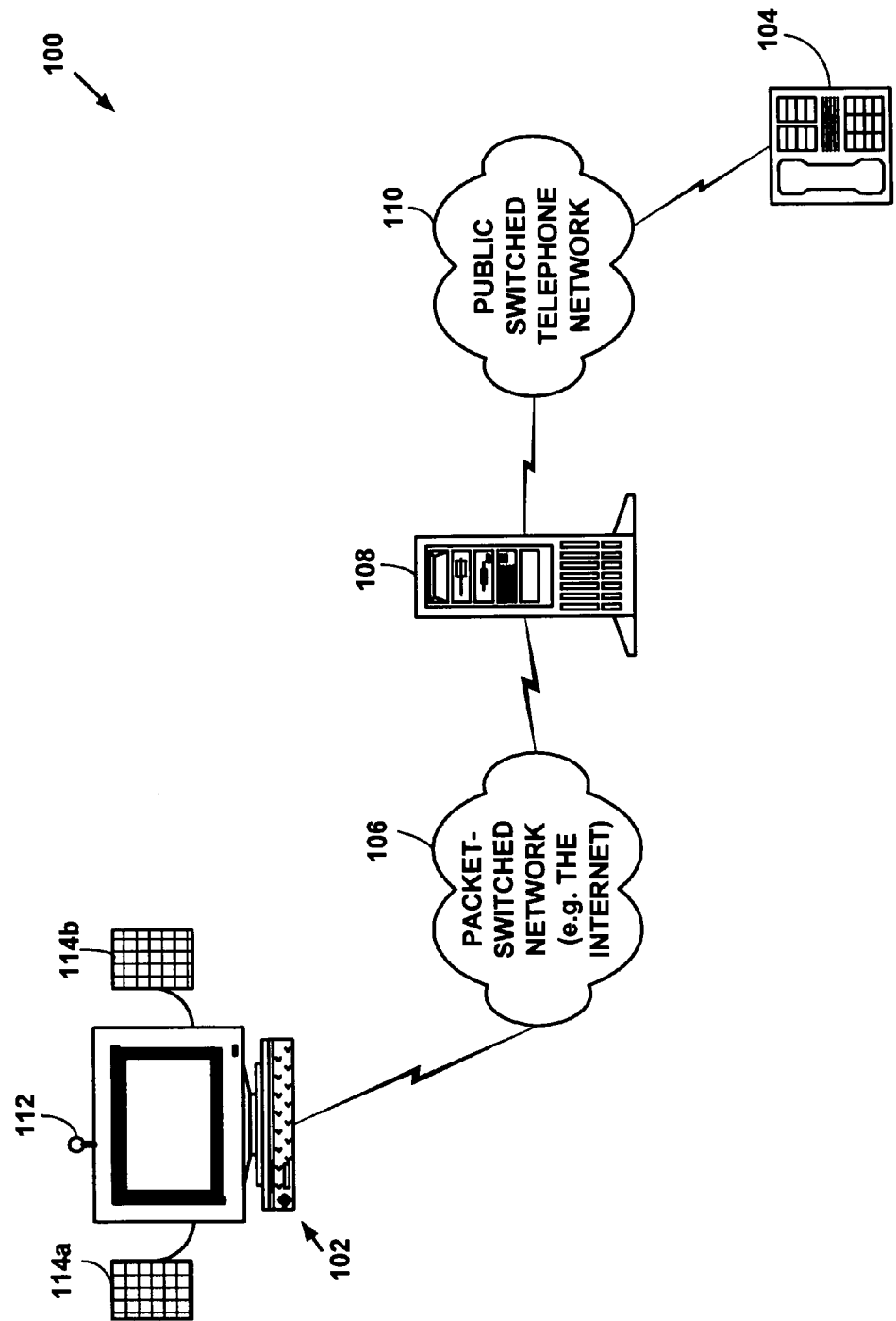
FIG. 1 is a simplified block diagram illustrating an exemplary packet-switched telephony system.

FIG. 1 is a simplified block diagram illustrating an exemplary packet-switched telephony system 100. The system 100 includes a computer 102 from which a user wishes to place a call to a telephone subscriber located at a phone 104. The computer 102 is linked to a packet-switched network 106, such as the Internet. An Internet Telephony Service Provider (ITSP) or other packet-switched telephony service provider may operate a telephony gateway 108 between the packet-switched network 106 and a Public-Switched Telephone Network (PSTN) 110. The PSTN 110 provides service to the phone 104. The packet-switched network 106 includes network equipment that routes the individual voice data packets to a destination address identified in the individual packets.

The computer 102 contains a microphone 112 and speakers 114a,b. During a call, a user located at the computer 102 can speak into the microphone 112 to provide a voice signal input to the computer 102. A processor in the computer 102 digitizes the user's voice and assembles the data into packets according to one or more protocols, such as the Internet Protocol (IP) suite. These voice data packets are then transmitted across the packet-switched network 106 to the gateway 108. The sampling rate of the voice signal is preferably chosen to be high enough to cause the digitized voice data to sound like a continuous voice signal to a human ear. The gateway 108 converts the voice data packets back into a voice signal for further transmission on the PSTN 110. The PSTN 110 transmits the voice signals on a dedicated circuit to the phone 104. A user located at the phone 104 receives the voice signals, which may be heard through a speaker associated with the phone 104. Similarly, the user located at the phone 104 can speak into a microphone at the phone 104 to cause a voice signal to be transmitted across the PSTN 110 to the gateway 108, where the voice signal is converted into voice data packets for transmission across the packet-switched network 106 to the computer 102. The processor in the computer 102 may convert the voice data packets into a voice signal to be played on the speakers 114a,b.

Although the gateway 108 is shown as being a single device in FIG. 1, an ITSP may have several or many gateways similar to the gateway 108. The different gateways would likely be located in various locations around the world to take advantage of possible savings in long distance fees. Although the PSTN 110 may offer circuit-switched telephone service to local phone subscribers as well as to subscribers located at more distant local exchanges, long distance fees might be incurred for placing calls through the distant local exchanges. Thus, an ITSP will preferably route the call to a gateway having a connection to a PSTN that can provide local service to the phone number to be called. An ITSP gateway may be used to administer such a call routing scheme for a particular ITSP.

II. Packet-Switched Telephony Server Provider Exemplary System

Figure 2:
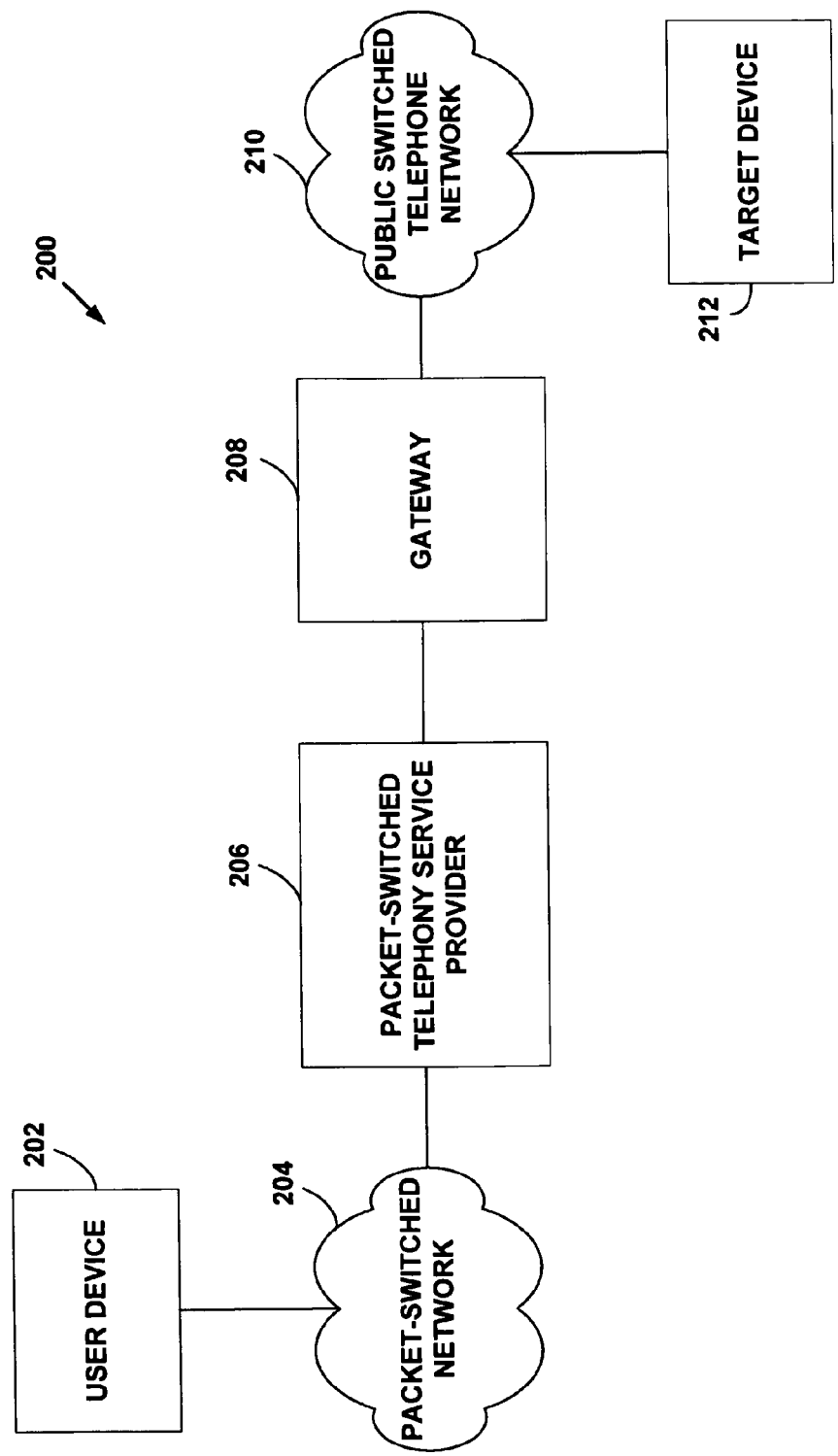
FIG. 2 is a simplified block diagram illustrating an exemplary packet-switched telephony system.

FIG. 2 is a simplified block diagram illustrating an exemplary packet-switched telephony system 200. The system 200 includes a user device 202, a Packet-switched Telephony Service Provider (PTSP) 206, a gateway 208, and a target device 212. The user device 202 is linked to the PTSP 206 through a packet-switched network 204, such as the Internet. The PTSP 206 is linked to the gateway 208. The link between the PTSP 206 and the gateway 208 may be through a packet-switched network, such as the Internet, or some other physical and/or wireless network. The gateway 208 is linked to the target device 212 through a PSTN 210 and/or some other network.

According to the exemplary system 200, a user located at the user device 202 may initiate a call to a target user located at the target device 212 by participating in a call initiation process involving the user device 202 and the PTSP 206. For example, the user device 202 may access a web-site maintained by the PTSP 206, using a web-browser, such as Microsoft Internet Explorer or Netscape Navigator. As another example, the user device 202 may execute a calling application to contact the PTSP 206 through the packet-switched network 204. The call initiation process may include choosing a phone number or address book entry to call, and may include specifying other call parameters. The PTSP 206 continues the initiation process by transmitting call initiation information to the gateway 208 so that the gateway 208 may attempt to reach the target device 212 through the public switched telephone network 210. If the call initiation process is successful, voice communications may be transmitted back and forth between the user device 202 and the target device 212. Voice data transmitted between the user device 202 and the PSTP 206 will preferably consist of packets containing voice information, as well as any other information desired by the user at the user device 202, or the PSTP 206. Data transferred between the PSTP 206 and the gateway 208 will also preferably be packetized data. Data transferred between the gateway 208 and the target device 212 via the PSTN 210 may include circuit-switched data rather than packet-switched data. Alternatively, the PSTN 210 may include one or more portions that are packet-switched and one or more portions that are circuit-switched. As a result of the various conversions and/or conveyances that occur at the PSTP 206 and gateway 208 over the packet-switched network 204 and the PSTN 210, the user device 202 is able to receive voice data transmitted by the target device 212, and vice versa.

A. User Device

The user device 202 is shown as a simple rectangular box in FIG. 2 to emphasize the variety of different forms the user device 202 might take on from one embodiment to the next. For example, the user device 202 might be any one of the following: a personal computer, a mobile phone, a wireless handheld device, or a packet-switched telephone. The user device 202 is not limited to any of these devices, and is intended to encompass future communication and information technology. Various embodiments of the system 200 will include a user device 202 having at least a link to the PSTP 206, a telephony client application, and a mechanism for user input and output. For example, the user device 202 may be a device that is capable of accessing the Internet and that is operable to execute a telephony client, such as a Java virtual machine or other "thin" client. Further details regarding the user device 202 may be found throughout this specification.

Figure 3:
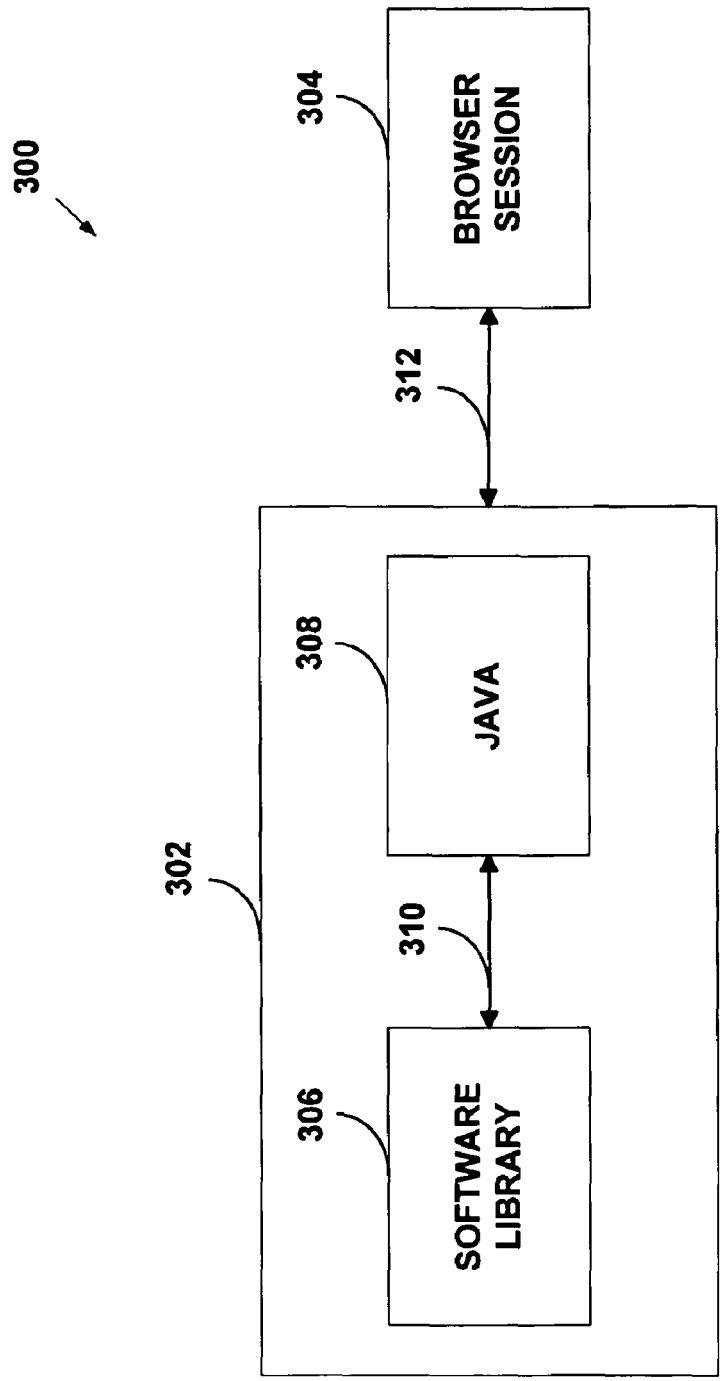
FIG. 3 is a simplified block diagram illustrating an exemplary call client system.

FIG. 3 is a simplified block diagram illustrating an exemplary embodiment of a call client system 300. The system 300 includes a call client 302 and a browser session 304. The call client 302 includes a software library 306 and a Java virtual machine 308. The software library 306 and the Java virtual machine 308 are linked by an interface 310. The call client 302 and the browser session 304 are linked by an interface 312. Interfaces 310 and 312 may be software links.

The software library 306 may include functionality for coding voice audio input into digital signals and for decoding digital signals into voice audio output, such as a Dynamic Link Library (DLL). Other functions may also be provided. In a preferred embodiment, the software library 306 includes a Real-Time Protocol (RTP) stack, an Application Program Interface (API) (such as a Microsoft Windows API), a voice codec (such as a G.711 codec module), and a call control stack. In one embodiment, a HyperText Transfer Protocol (HTTP) stack is implemented to assist in firewall circumvention. Additionally or alternatively, a port scan module may be included to identify potential ports to use to avoid firewall interference.

The Java virtual machine 308 preferably includes an interface, such as a Graphical User Interface (GUI). According to an alternative embodiment, the Java virtual machine 308 also includes a billing system, to assist in keeping track of call time and other potential billing parameters. While the Java virtual machine 308 includes "Java" in its description, the Java language is merely one implementation, and other languages and module types are also intended to be within the scope of the present system. Java, from Sun Microsystems, is merely one possibility for implementing the Java virtual machine, and the provided functionality (e.g. GUI) is more relevant than the particular implementation of the Java virtual machine.

The browser session 304 is operable to support a Java virtual session, such as one downloaded from the PTSP 206.

The user device components described above are merely preferred implementations, and variations may be made without departing from the intended scope of the present system. For example, one or more of the user device components described above may be combined with one or more other components. Moreover, additional components may be provided to perform other functions or to assist in performing functions described above. While the components of the user device are preferably primarily software-based, one or more components may include hardware or firmware aspects.

B. Packet-Switched Telephony Server Provider (PTSP)

Figure 4:
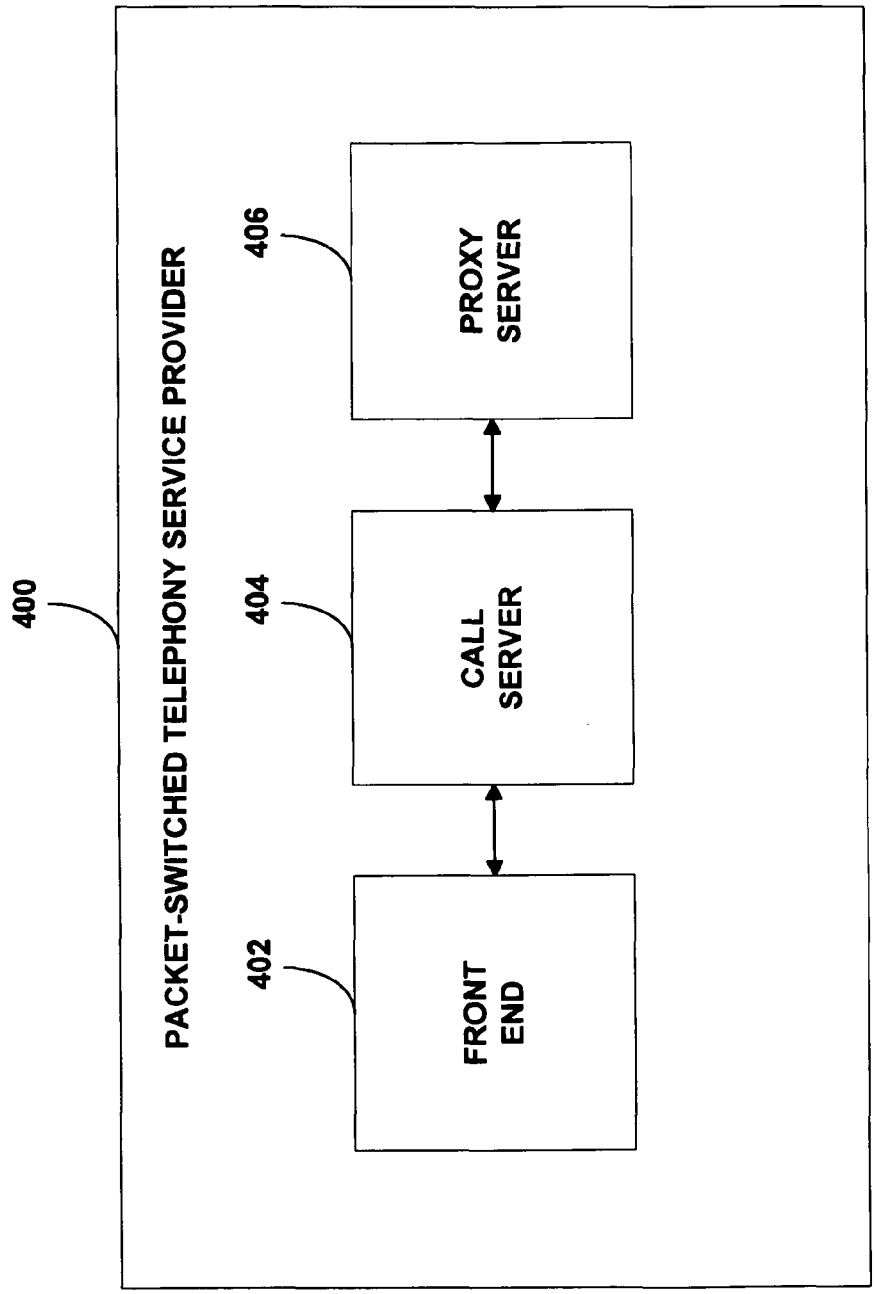
FIG. 4 is a simplified block diagram illustrating an exemplary Packet-switched Telephony Server Provider system.

FIG. 4 is a simplified block diagram illustrating at least a portion of an exemplary Packet-switched Telephony Server Provider (PTSP) system 400. PTSP 400 may be similar to or substantially the same as the PSTP 206 of the system 200. The PSTP 400 includes a front end 402, a call server 404, and a proxy server 406. Other configurations are also possible, such as configurations with different numbers of these components, and are intended to be within the scope of the present system. In addition, while the components of PSTP 400 are shown as being co-located, this is merely for purposes of illustration, and one or more parts of the PSTP 400 may be remotely located from other parts. Similarly, the parts may be combined into one physical device.

1. Front End

Figure 5:
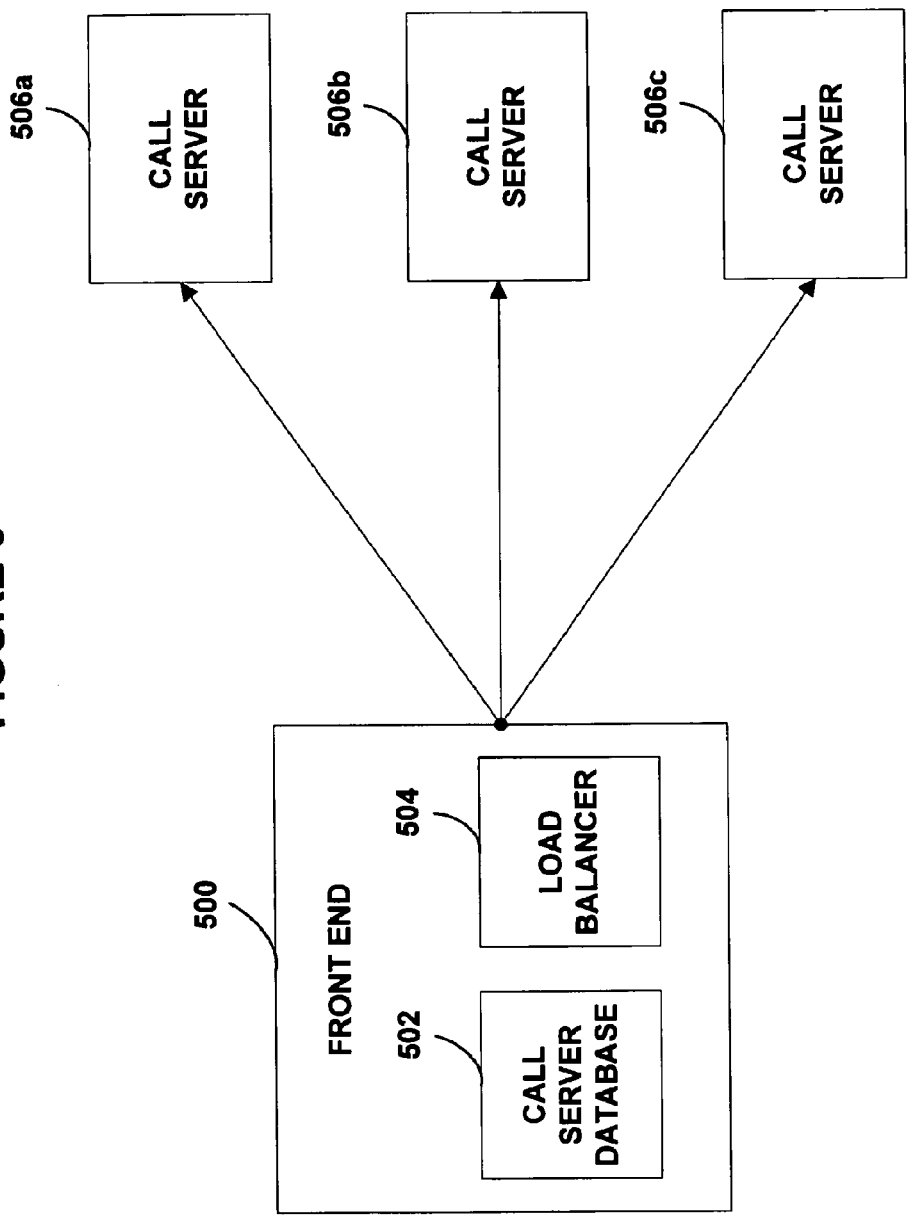
FIG. 5 is a simplified block diagram illustrating an exemplary front end.

FIG. 5 is a simplified block diagram illustrating an exemplary front end 500. Front end 500 may be similar to or substantially the same as the front end 402 of the PTSP 400. The front end 500 preferably includes a call server database 502 and a load balancer 504. The front end 500 may be used to select a particular call server 506a-c, if more than one call server is available. Although three call servers 506a-c are shown in FIG. 5, other numbers of call servers may alternatively be provided. If only one call server is provided, then load balancing would likely provide little or no performance benefit. In some embodiments, it may be possible to eliminate much or all of the front end altogether. In addition, the front end 500 is preferably only involved when a call request is first received by the PTSP 400 and possibly to maintain the call server database 502. After any interactions the user device 202 has with the front end 500 have been completed, many or all user interactions will be primarily through a call server, such as one of the call servers 506a-c.

The front end 500 may be used as call requests are received by the PTSP 400, to assist in handling a large number of calls. The PTSP 400 may keep information pertaining to current calls in the call server database 502. As a result, the current number of calls on any particular server, such as any one of the call servers 506a-c, may be monitored and used to beneficially handle new call initiations. The front end 500 may thus access current call data to select an appropriate call server for an incoming call request. For example, the front end 500 may use call density data to determine which of the call servers 406a-c is the least busy, in order to possibly improve call performance. As another option, the front end 400 may use a round-robin selection scheme, in which the front-end 500 distributes individual call requests to the call servers 506a-c in some ordered manner irrespective of call density. Other load balancing techniques may also be used, such as utilizing particular call servers to correspond to particular users.

It may be desirable to implement more than one call server 506a-c at a PSTP 400 for one or more of the following reasons. The quantity of calls that may be handled by a PTSP 400 will likely be increased as the PTSP 404 adds call servers 506a-c. For example, a call server 506a-c may be able to handle only a limited number of concurrent calls (e.g. up to 150 calls per server) before call quality degrades to a certain threshold service level. In addition, different call servers 506a-c may be optimized to interface with different gateways, such as the gateway 208 shown in the system 200. Different gateways 208 often utilize network equipment provided by different equipment manufacturers. The likelihood of compatibility problems may be decreased if a call server 506a-c is implemented on a device built by the same manufacturer as the gateway manufacturer. As an alternative to hardware-matching, a call server's software or firmware may be tweaked to increase compatibility with a particular gateway 208. Software tweaking may address problems caused by different manufacturers implementing slightly different "flavors" (additional/alternative features, etc.) of standard protocols, for example. Another advantage of using multiple call servers 506a-c is that different call server/gateway combinations may utilize different protocols for telephony services. For example, one call server 506a-c may be dedicated to a gateway 208 that implements the H.323 protocol, while another call server 506a-c may be dedicated to a gateway 208 running the Session Initiation Protocol (SIP) or the Media Gateway Control Protocol (MGCP). If a particular telephony protocol is updated, only the call server(s) 506a-c implementing that protocol is required to implement the update.

If load balancing is provided by the PTSP 400, then a variety of implementation techniques may be used, involving software or hardware, for example. In one embodiment, a hardware solution called the BIG-IP Controller, available from F5 Networks Inc. of Seattle, Wash., may be utilized. In another embodiment, a software solution called Resonate Central Dispatch, available from Resonate, Inc. of Sunnyvale, Calif. Other load balancing techniques are known, many of which may be used to advantage in PTSPs 400 handling large call volumes. Further details regarding the load balancer 504 and the front end 500 may be found throughout the specification.

2. Call Server

Figure 6:
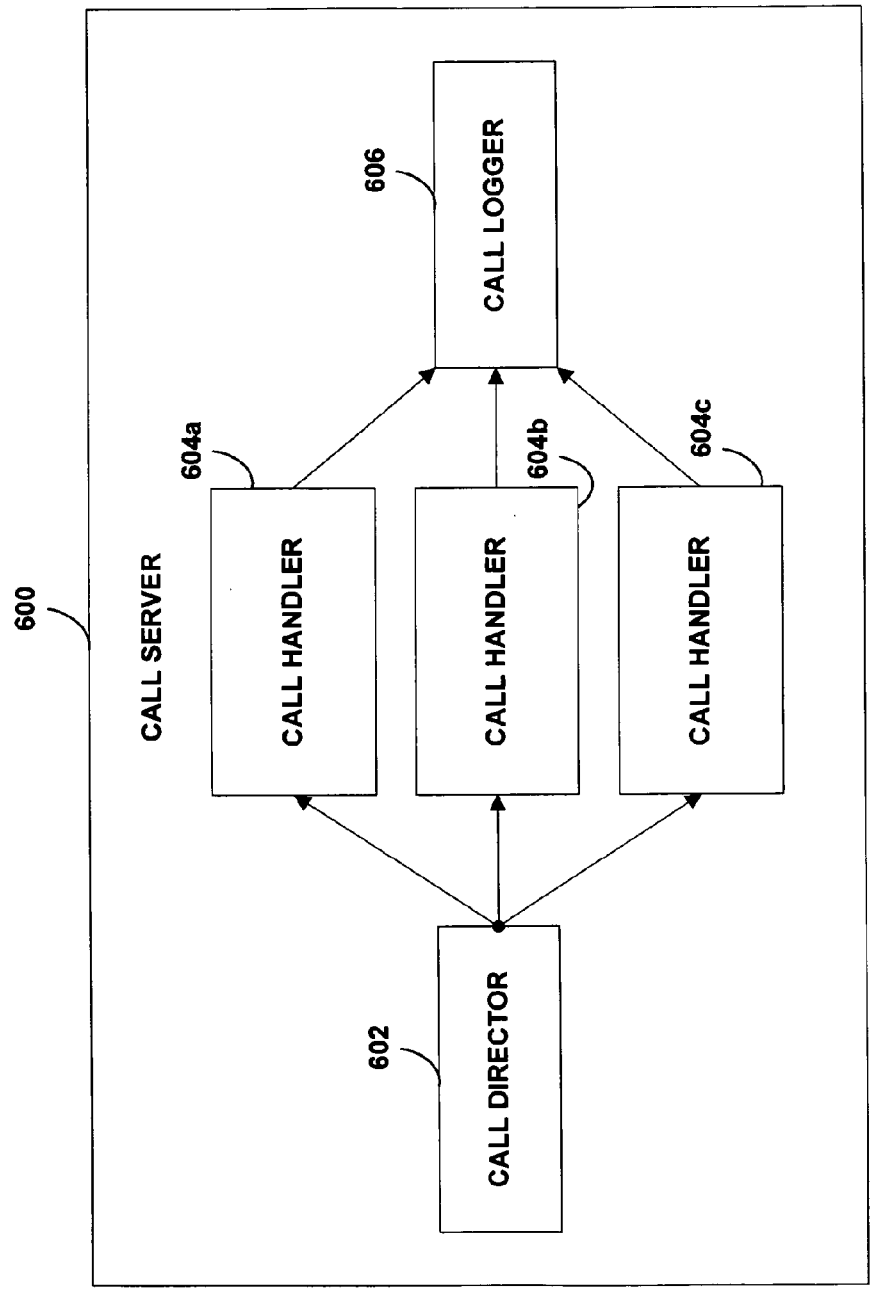
FIG. 6 is a simplified block diagram illustrating an exemplary call server.

FIG. 6 is a simplified block diagram illustrating an exemplary call server 600. Call server 600 may be similar to or substantially the same as the call server 404 of the PTSP 400. The call server 600 preferably includes a call director 602, a plurality of call handlers 604a-c, and a call logger 606. Although three call handlers 604a-c are shown in FIG. 6, this is merely for purposes of illustration, and other quantities of call handlers may be provided. In one alternative embodiment, only one call handler 604 is provided.

a. Call Director

Figure 7:
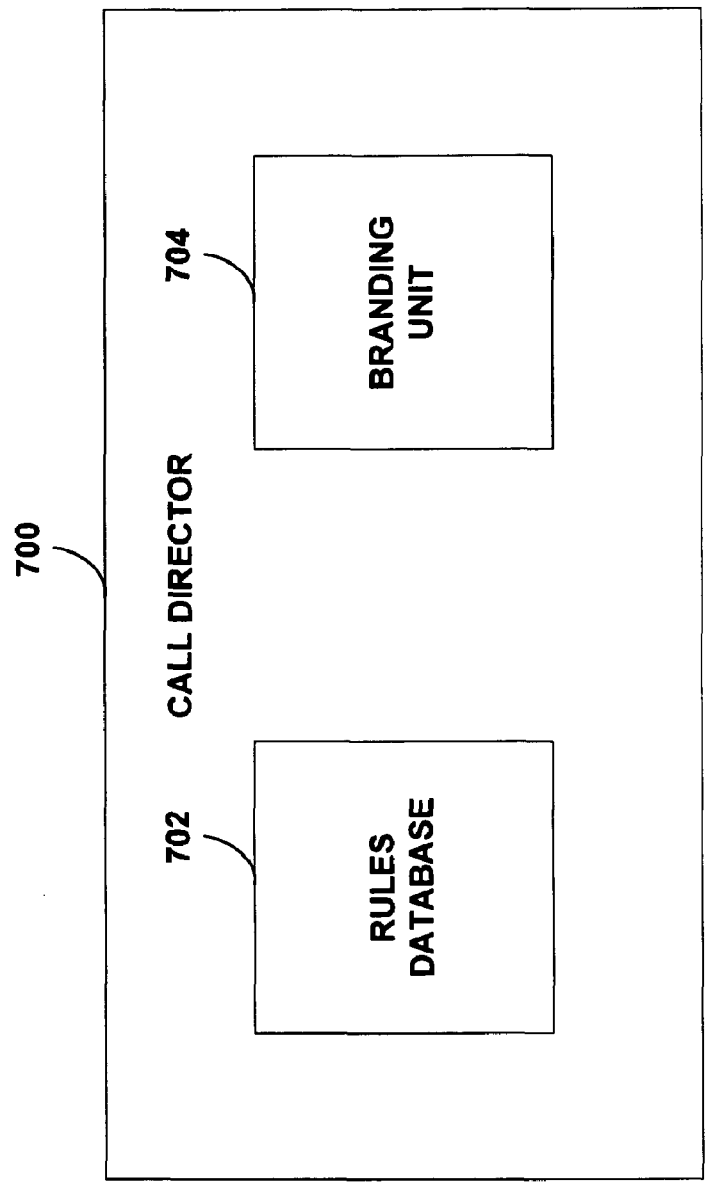
FIG. 7 is a simplified block diagram illustrating an exemplary call director.

FIG. 7 is a simplified block diagram illustrating an exemplary call director 700, which may be included within the call server 600. The call director 700 preferably includes a rules database 702 and a branding unit 704.

Upon receiving a call request from a user device, such as the user device 202 in the system 200, the call director 700 launches a call handler, such as one of the call handlers 604a-c shown in FIG. 6, if the user device is authorized to make the requested call. The call director 700 may, for example, access the rules database 702 to determine an authorization status for the requested call. In an exemplary embodiment, the call director 700 parses a phone number and checks the rules database 702 to see if calls are allowed to the destination signified by the prefix of the phone number. The rules database 702 may also contain information on service agreements with users, so that the call director 700 may determine whether the user device has used up a maximum number of minutes, for example. Other authorization techniques may be implemented in addition to what has been described above, by appropriately modifying the information stored in the rules database 702 and/or the operations on the information contained in the rules database 702. If the call director 700 determines that the user device 202 is not authorized to make a particular call, then an "unauthorized" message may be transmitted to the user device 202, or some other action may be taken. Authorization may be determined from a user name/password login process, from an inspection of "cookies" located on the user device 202, or from some other technique. If the call director 700 determines that the user device 202 is authorized to make a particular call, then a call handler 604a-c may be launched, such as through the issuance of a launch command (e.g. a UNIX command).

The branding unit 704 may be included to provide branding information to the user device. For example, the branding unit 704 may transmit an audio sample to the user device to inform the user of the PTSP's 400 identity. Alternatively, advertisements for the PTSP 400 or for other commercial entities may be transmitted to the user device 202, such as in a scheme in which the user agrees to view advertisements in exchange for receiving telephony service. The selection of which advertisements are transmitted may be based on the phone number to be called, the user device 202, the time of day, or other parameters. Other advantages may also be realized through various embodiments. Additionally, branding may be performed at a different location in the PTSP, or it may be omitted altogether.

b. Call Handler

Figure 8:
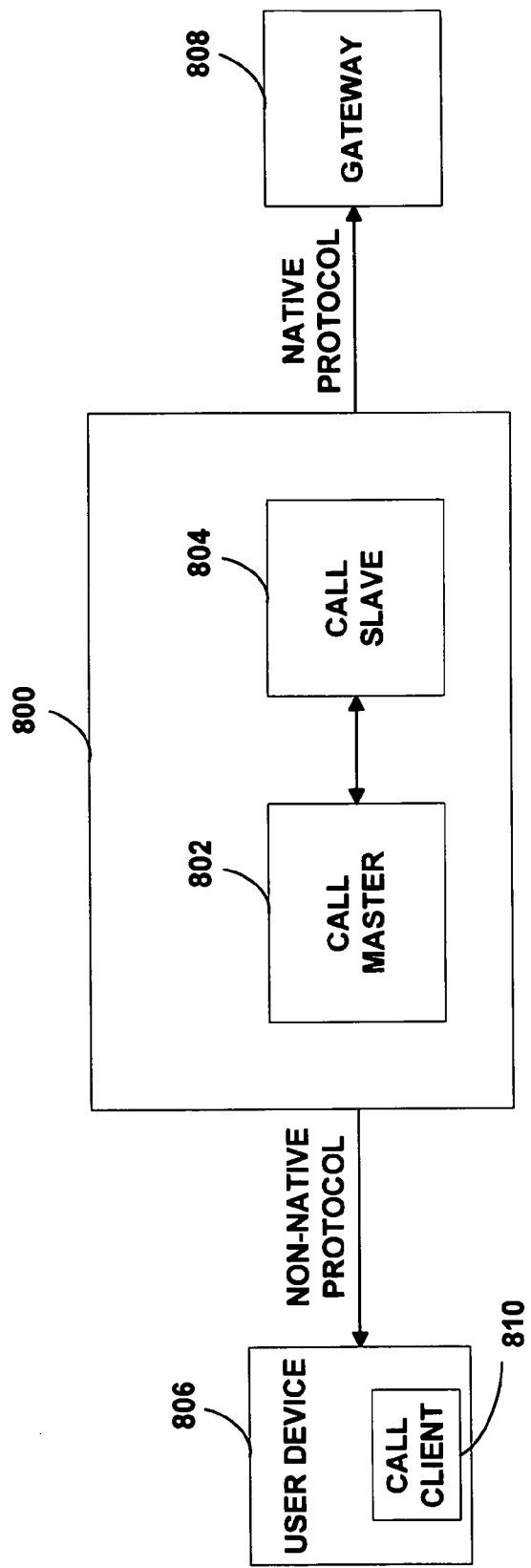
FIG. 8 is a simplified block diagram illustrating an exemplary call handler.

FIG. 8 is a simplified block diagram illustrating an exemplary call handler 800. The call handler 800 preferably includes a call master 802 and a call slave 804. The call master 802 is linked, such as through a packet-switched network, to a call client 810 on a user device 806. The call slave 804 is linked to a gateway 808 through a network, such as a packet-switched network (e.g., the Internet, or a dedicated connection).

In a multiple-user environment, a call handler similar to the call handler 800 may be launched for every call. Thus, in any one call server 600, there may be many calls at any particular time. Each call handler 800 may be launched on a specific port that is assigned to the user device 806 that initiated the call. Call handlers 800 may communicate with each other, for example, during multiparty conference calls.

The call master 802 is configured to communicate with the call client 810 on the user device 806. The user device 806 and the call master 802 preferably communicate according to a non-native protocol having very little overhead and providing specialized information to the PTSP 400, such as call quality, etc. Other communications, include pings, Transmission Control Protocol (TCP) requests, and branding tones, may also be exchanged, according to exemplary embodiments. Through the use of such a non-native protocol, the PTSP need not modify the call client 810 every time a modification is made to a native telephony protocol. An example of a non-native protocol is a proprietary protocol that carries voice data and little else. In contrast, a native protocol (such as H.323, SIP, or MGCP) will typically include overhead to satisfy the expectations and requirements defined in the native protocol. Efficiency and robustness may be realized by using a streamlined non-native protocol between the user device 806 and the call master 802. In addition, the same non-native protocol may be used regardless of what protocol (e.g. H.323, SIP, MGCP, etc.) is used by the gateway 808. The call client 810 is therefore allowed to be small in size (e.g. around 200 kilobytes), relative to existing telephony clients that implement much or all of a standard telephony protocol used on a gateway 808. Further details regarding the call client 810 and the non-native protocol may be found throughout the specification.

According to a preferred embodiment, the non-native protocol includes a set of data messages in a proprietary format to control basic call functionality. These messages are formatted as UDP (User Datagram Protocol), TCP (Transmission Control Protocol), or HTTP (Hyper-Text Transport Protocol) and are sent from the user device 806 to the PTSP to properly set up, monitor, and tear down calls. The messages in the non-native protocol may include information such as one or more of the following: an IP address of the user device; a port number to transmit data to the user device; an ITU E.164 telephone number; a user name for identification; a token, key, and/or password for authorization; and commands for the call handler. The messages in the native protocol may include data transferred as Packed Encoding Rules (PER), Basic Encoding Rules (BER), or ASN.1 notation for H.323 formatted messages, or Uniform Resource Locator (URL) for SIP formatted messages. Other non-native and native protocols may also be used.

The call slave 804 communicates with the gateway 808 using the native protocol of the gateway 808. As a result, the call slave 804 preferably implements a large portion of the native protocol stack, and, in some embodiments, may implement the entire native protocol stack. This is in contrast to the call master 802, which need only implement a skeleton non-native protocol. When updates or modifications are made to the native protocol associated with the gateway 808, only the call slave 804 is modified, according to a preferred embodiment. The call master 802 preferably provides (through the call handler 800) the call slave 804 with only the minimum data required to initiate, maintain, or teardown the call. This minimum data may be all that is required by all native protocols supported by all of a PTSP's call servers. As a result, the same call master 802 and call client 810 combination may be used for all call servers regardless of what native protocol is used, according to a preferred embodiment. The call handler 800 may include protocol stacks of both the native protocol and the non-native protocol to facilitate the transfer of call data from the call master 802 to the call slave 804 in the appropriate format. The call handler 800 may translate the non-native protocol data received by the call master 802 to the native protocol used by the call slave 804 to communicate with the gateway 808, and vice versa. Thus, in some embodiments, the call slave 804 may be obtained "off-the-shelf," without any other modifications being made to the call handler 800. In another embodiment, the call handler 800 may include protocol stacks for two or more different native protocols, to allow the call slave 804 to interface with more than one gateway, each running a different native protocol. Additional details regarding the call handler 800 may be found throughout the specification.

Figure 9:
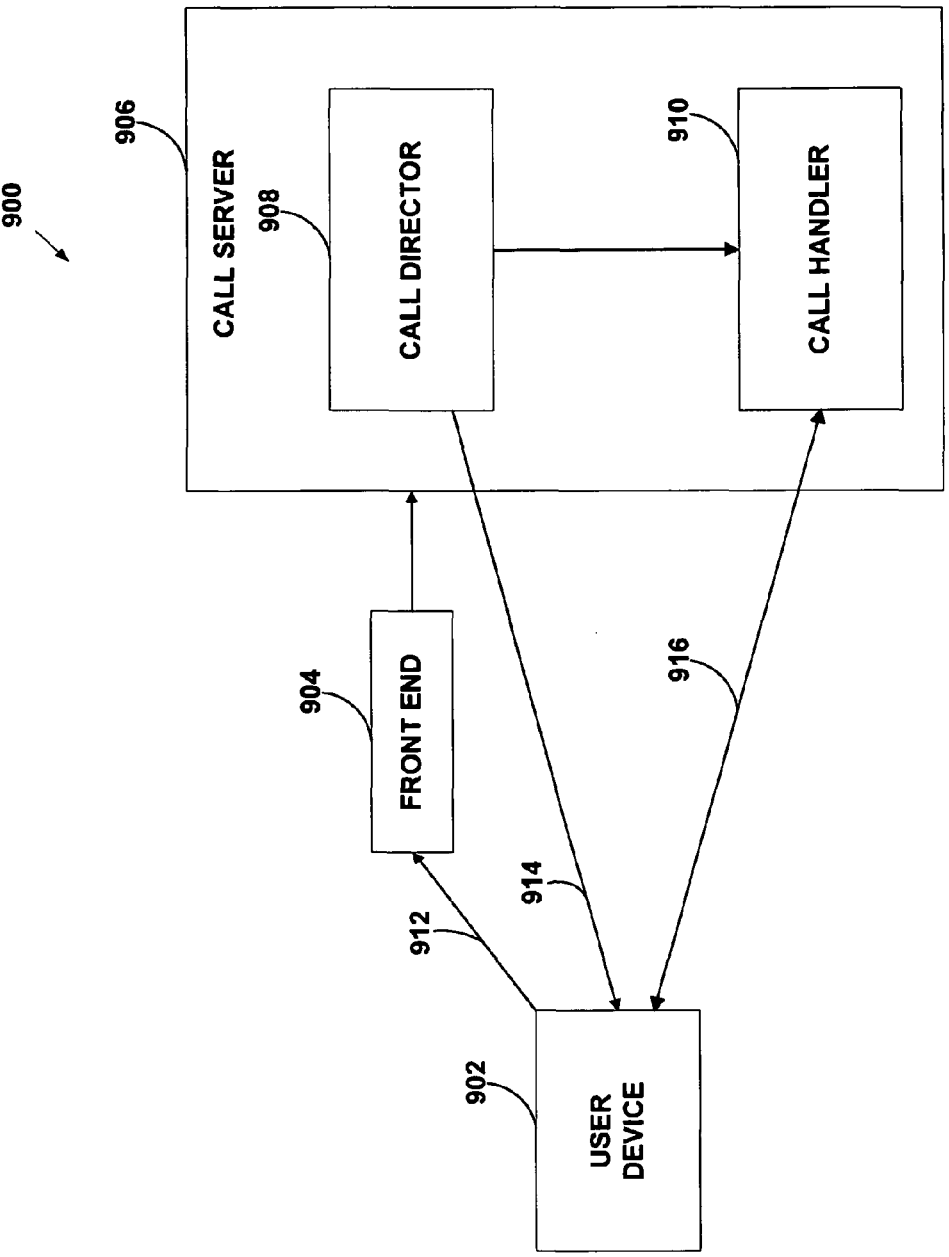
FIG. 9 is a simplified block diagram summarizing user device communications with a call server.

FIG. 9 is a simplified block diagram illustrating user device communications with the call server in a system 900, according to a preferred embodiment. The system 900 includes a user device 902, a front end 904, and a call server 906. The call server 906 includes a call director 908 and a call handler 910.

A request to initiate a call 912 from the user device 902 may be received by the front end 904, which may select the call server 906. The call director 908 within the call server 906 will determine an authorization status for the requested call. If the call director 908 determines that the user device 902 is not authorized to make a particular call, then the call director 908 may send an "unauthorized" message 914 to the user device 902. If the call director 908 determines that the user device 902 is authorized to make a particular call, then the call director 908 will launch the call handler 910 within the call server 906. Once the user device 902 is authorized, the user device 902 and the call server 906 will transmit and receive messages 916 using the call handler 910.

c. Call Logger

Figure 10:
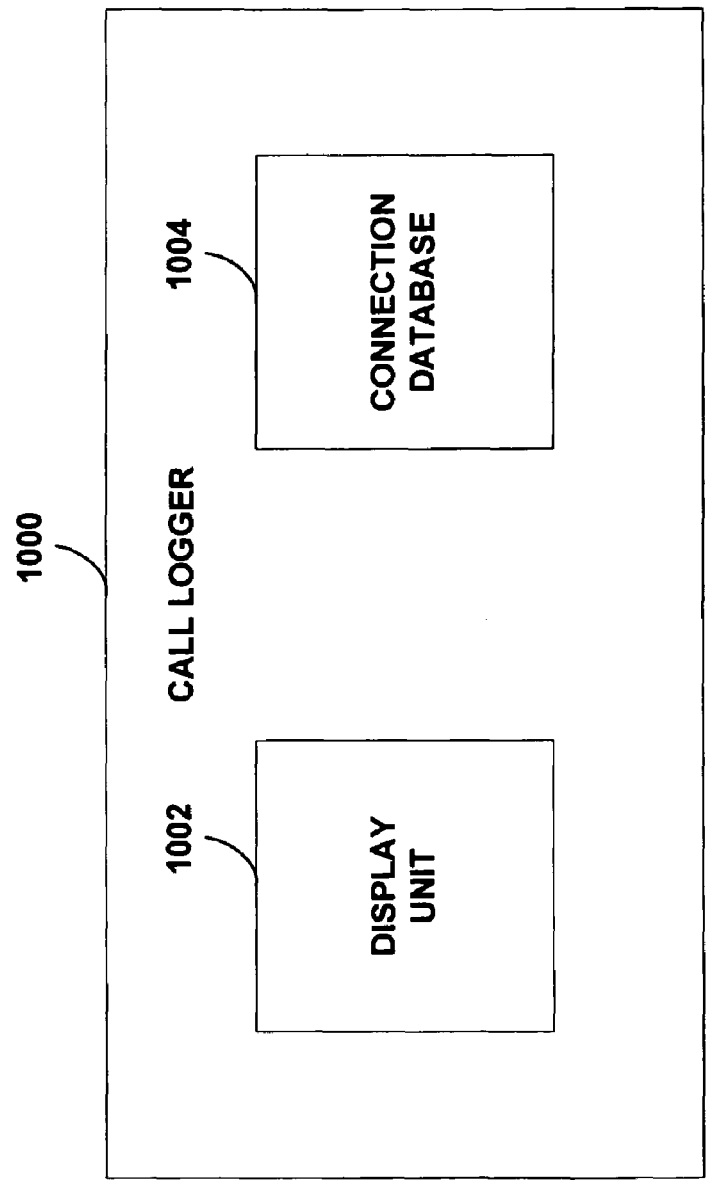
FIG. 10 is a simplified block diagram illustrating an exemplary call logger.

FIG. 10 is a simplified block diagram illustrating an exemplary call logger 1000. The call logger 1000 preferably includes a display unit 1002 and a connection database 1004. Other configurations, including more or fewer components, are also intended to be within the scope of the present system.

The call logger 1000 may be included in a PSTP system, such as the PTSP system 400, in order to keep track of all active calls in a particular call server, such as the call server 600. The call logger 1000 may also remove inactive connections, which may occur during a disconnect event or a specified idle time event, such as 30 seconds of inactivity. For example, the call logger 1000 may track at least any of the following: when a call handler 800 is launched, when a call is ringing at a target device 212, when a call is established, and when a call is disconnected (hung up by the target device 212 or the user device 202). Any or all of these may be stored in the connection database 1004, and may preferably be displayed on the display unit 1002 for viewing by an administrator of the PTSP 400. Although the call logger 1000 is shown as part of the call server 600, this is merely a preferred embodiment, and the call logger 1000 may be situated at another location at or accessible by the PTSP 400. As another alternative, the call logger 1000 may be omitted. This is, however, not recommended in a multiple-user setting, due to the desirability of tracking calls and equipment usage. In another embodiment the connection database 1004 is associated with (and may be included with) the call server database 502.

3. Proxy Server

Figure 11:
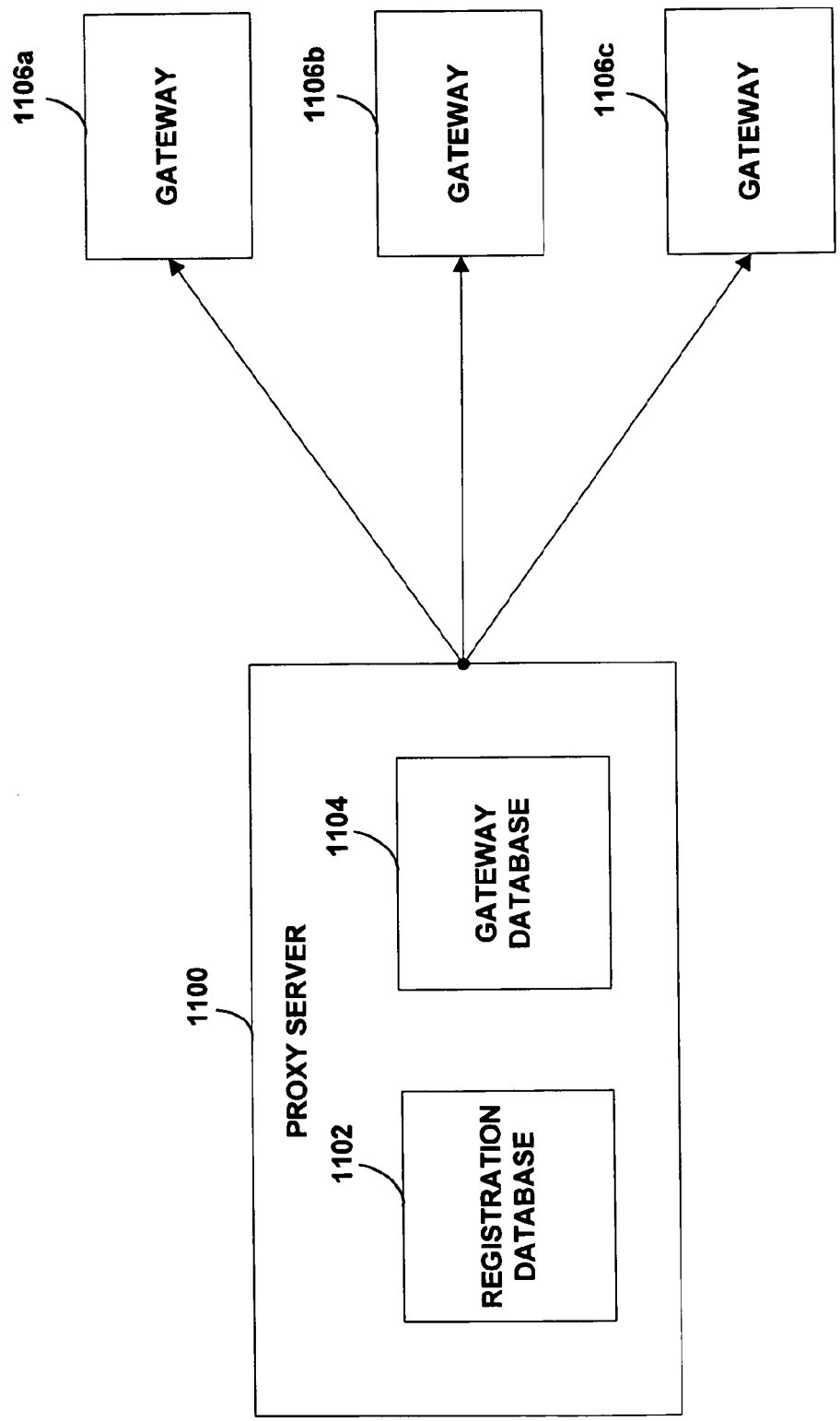
FIG. 11 is a simplified block diagram illustrating an exemplary proxy server.

FIG. 11 is a simplified block diagram illustrating an exemplary proxy server 1100. Proxy server 1100 may be similar to or substantially the same as the proxy server 406 of PTSP 400. The proxy server 1100 preferably includes a registration database 1102 and a gateway database 1104. The proxy server 1100 may be used to select a gateway 1106a-c, if more than one gateway is provided. Gateway selection criterion may include the number of calls the gateway 1106a-c is handling, the location of the gateway 1106a-c, and the type of telephony protocol the gateway 1106a-c uses.

The registration database 1102 stores information pertaining to users and/or user devices 202. In a preferred embodiment, every potential user must first register with the PTSP 400 prior to placing any calls over equipment maintained by the PTSP 400. This may assist in billing, authentication, fraud control, and marketing intelligence, for example. In some embodiments, each registered user is associated with one or more proxy servers 1100, and the association is stored in the registration database 1102.

The gateway database 1104 stores information pertaining to the gateways 1106a-c with which the PSTP 400 is associated, the gateway administration entity (e.g. Focal Communications, Sprint, etc.), how many calls are being handled by each gateway 1106a-c, and other information pertaining to gateways 1106a-c associated with the PTSP 400.

The proxy server 1100 may access the registration database 1102 and the gateway database 1104 to select an appropriate gateway 1106a-c for a call. The proxy server 1100 may, for example, be a gatekeeper according to the H.323 protocol. In a preferred embodiment, the proxy server 1100 is only involved during a gateway selection process. In another embodiment, only one gateway is present, and the proxy server may be omitted. (In such a case, it may be desirable to continue maintaining the registration database 1102 and/or the gateway database 1104, for system monitoring). After the proxy server 1100 has selected an appropriate gateway 1106a-c, the IP address of the selected gateway 1106a-c is available to various components within the PTSP 400, such as the call handler 800. Although three gateways 1106a-c are shown in FIG. 11, this is for illustrative purposes only, and other numbers of gateways may also be provided.

In a preferred embodiment, the PTSP 400 has a plurality of proxy servers 1100 associated with a respective plurality of gateways 1106a-c. The proxy server 1100 used for a particular call might, for example, be based on a prefix in a phone number to be called. Other proxy selection criteria may also be used.

C. Gateway

The gateway 208 is a known device that is often located on the premises of a conventional (circuit-switched) telephony provider. The gateway 208 typically serves at the point where data on a call is translated from packet-switched data to circuit-switched data. In some embodiments, the Public Switched Telephone Network (PSTN) 210 may include packet-switching network portions. For purposes of the present system, the details regarding the gateway 208 are important primarily for determining what native protocol(s) and networking equipment are in use, in order to select an appropriate call server 600 (and call slave 804).

D. Target Device

The target device 212 is preferably a telephone having a direct or indirect connection to the PSTN 210, or to some other network. Alternative implementations of the target device 212, such as a mobile phone and other communication device, are also intended to be within the scope of the present system. The details regarding the target device 212 are not of particular importance for operation of the PTSP 400. The exact configuration of the target device 212 will likely depend on the network(s) between the gateway 208 and the target device 212. The user device 202 (or an associated user) need only know how to reach the target device 212, such as by dialing a phone number, selecting an address book entry, or entering some other target identifier.

Figure 12:
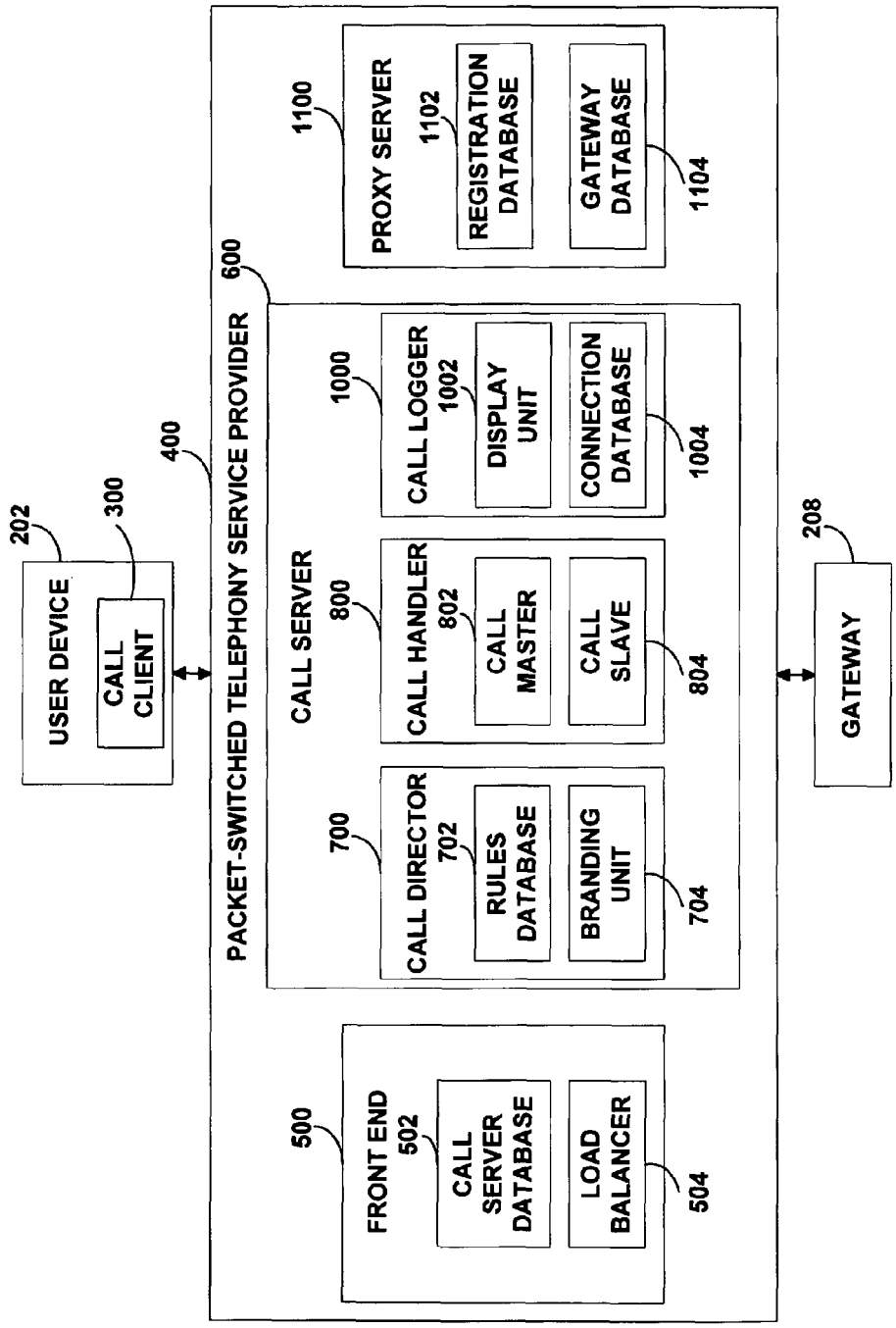
FIG. 12 is a simplified block diagram illustrating the details of the PTSP, according to an exemplary embodiment.

FIG. 12 illustrates a packet-switched telephony system 1200, according to a preferred embodiment. The system 1200 is shown to include components as described above, with like reference numerals indicating like functionalities and connections. As was described above, many variations may be made from the illustrated configuration, without departing from the intended scope of the system. It should also be noted that a target device and a PSTN have been omitted from FIG. 12 to improve clarity of illustration.

III. Communication of Packet-Switched Data from the User Device

A. Call Operation

First Exemplary Embodiment

Figure 13:
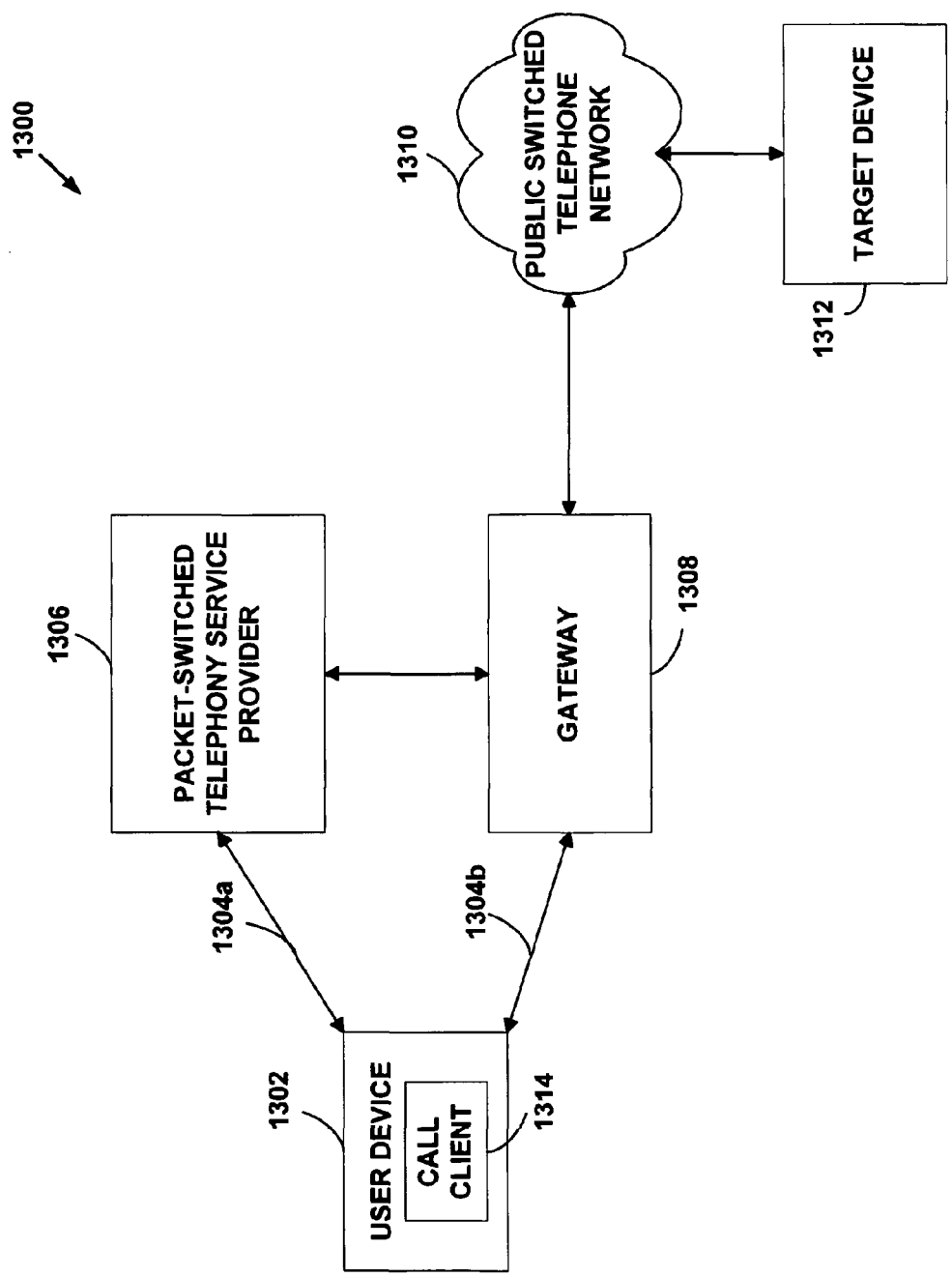
FIG. 13 is a simplified block diagram illustrating an exemplary embodiment employing two data streams from a user device.

FIG. 13 is a simplified block diagram illustrating call operation in a telephony system 1300 according to a first exemplary embodiment. The system 1300 includes a user device 1302, a PTSP 1306, a gateway 1308, and a target device 1312. The user device 1302, the PTSP 1306, the gateway 1308, and the target device 1312 of system 1300 may be similar to or substantially the same as the user device 202, the PTSP 206, the gateway 208, and the target device 212 of system 200.

The user device 1302 is linked to both the PTSP 1306 and the gateway 1308 through a packet-switched network 1304, such as the Internet. The PTSP 1306 is also linked to the gateway 1308, such as through the Internet, a dedicated connection, or some other network. The gateway 1308 is linked to the target device 1312 through a PSTN 1310 and/or another network.

The user device 1302 sends call control data via the packet-switched network 1304*a* to the PTSP 1306. Examples of call control data include setup information (e.g. the call request, the phone number to call, etc.), ping information sent periodically (e.g. "stay alive" signals, signal strength indicators, etc.), and disconnect signals. The user device 1302 sends media data via the packet switched network 1304*b* to the gateway 1308. Thus, if the packet-switched network 1304*a,b* is an IP network, different packets from the user device 1302 may have different destination IP addresses, depending on the type of data contained in the packet.

The embodiment shown in FIG. 13 may provide performance benefits. Because media is transmitted directly to the gateway 1308, rather than through the PTSP 1306, there will likely be fewer "hops" between the user device and the target device, resulting in less delay. In addition, because an industry standard may be used to communicate media with the gateway, there will likely be fewer dropped calls, quicker ping times, and more scalability. One possible disadvantage may result from having to implement portions of a native protocol at the user device 1302. The call client 1314 may be a larger download for the user device 1302 than if all packets (including media) were transmitted by the user device 1302 to the PTSP 1306, in which a non-native protocol could be used for all packet transmissions. Because call control is still primarily handled by the PTSP 1306 in the system 1300, the call client 1314 on the user device 1302 is still likely to be smaller than it would be if call control were implemented at the gateway 1308. If call control were implemented at the gateway 1308, the user device 1302 would likely need to implement a more complete telephony stack in order to communicate with the gateway 1308.

Either party to the call shown in the system 1300 may initiate a disconnect procedure. If the target device 1312 initiates the disconnect procedure, the PSTN 1310 forwards the disconnect request to the gateway 1308. The gateway 1308 communicates the disconnect information to the call server of the PTSP 1306, and the call server 600 transmits a disconnect message to the user device 1302, to cause the user device 1302 to stop audio traffic transmission and return to a "ready" state. If the user device 1302 initiates the disconnect procedure, the call client 1314 on the user device 1302 transmits a disconnect message to the call server 600 of the PTSP 1306. The PTSP 1306 communicates the disconnect request to the gateway 1308 to cause the call to be disconnected.

B. Call Operation

Second Exemplary Embodiment

Figure 14:
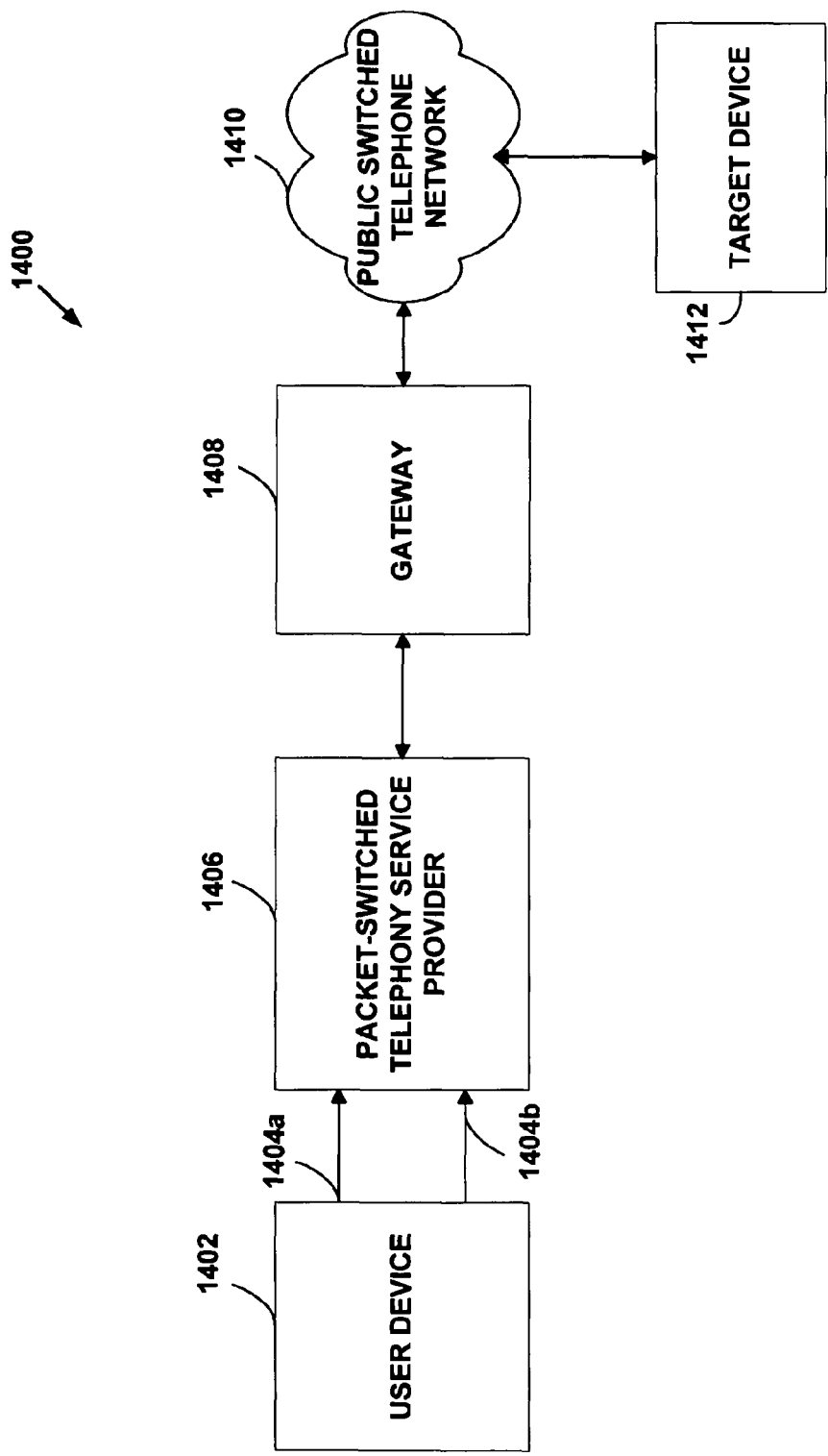
FIG. 14 is a simplified block diagram illustrating an exemplary embodiment employing a single data stream from a user device.

FIG. 14 is a simplified block diagram illustrating call operation in a telephony system 1400 according to a second exemplary embodiment. System 1400 includes a user device 1402, a PTSP 1406, a gateway 1408, and a target device 1412. The user device 1402, the PTSP 1406, the gateway 1408, and the target device 1412 of system 1400 may be similar to or substantially the same as the user device 202, the PTSP 206, the gateway 208, and the target device 212 of system 200. The user device 1402 is linked to the PTSP 1406 through a packet-switched network 1404, such as the Internet. The PTSP 1406 is linked to the gateway 1408 through a packet-switched network, such as the Internet, or some other network. The gateway 1408 is linked to the target device 1412 through the PSTN 1410.

In contrast to the first embodiment shown in FIG. 13, packets containing media and call control information are transmitted to the PTSP 1406, preferably according to a non-native protocol. The PTSP 1406 (i.e. the call handler 800) transmits the information to the gateway 1408, according to the native protocol of the gateway 1408. Similarly, media and call control packets from the gateway 1408 are transmitted to the PTSP 1410, and the PTSP 1410 transmits similar packets to the user device 1402.

In a potentially advantageous aspect of the second embodiment, the non-native protocol includes transmitting the media and/or the call control information as HTTP packets, to assist in traversing firewalls, which often block media traffic on unrecognized ports. If a port number normally associated a non-telephony application is used (e.g. ports 20, 21, 22, 23, 25, 80, 110, 119, 443, and/or 7070) is used, then a firewall is more likely to allow the media to pass through.

In another aspect of the second embodiment, conference calling may be enabled, since all media flows through the PTSP 1406. The PTSP 1406 may thus serve as a mixing entity for two or more user devices 1402 and/or target devices 1412.

Figure 15:
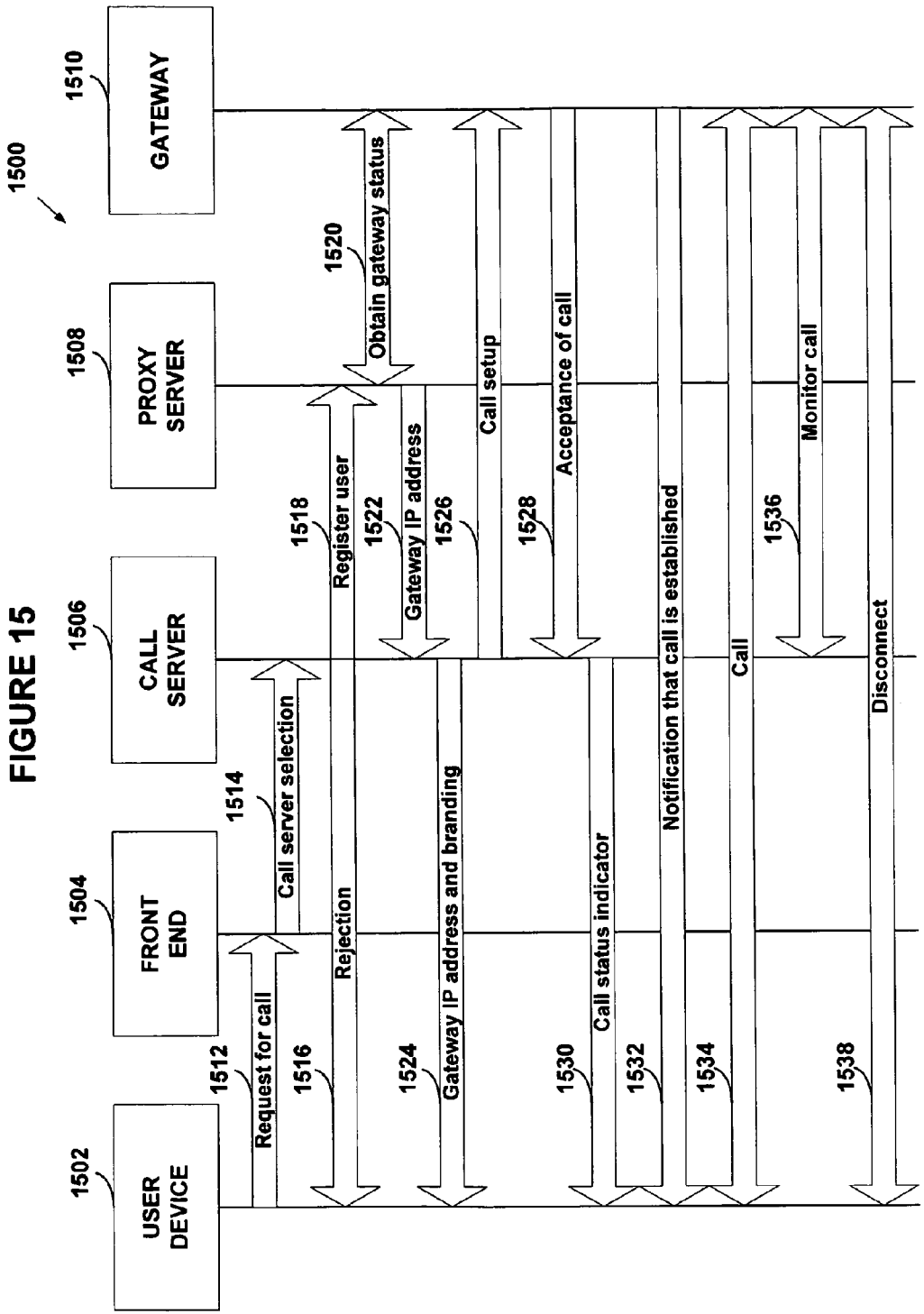
FIG. 15 is a simplified message flow diagram illustrating an exemplary call control sequence.

FIG. 15 is a message flow diagram illustrating a method 1500 for providing packet-switched telephony service, according to an exemplary embodiment. The entities shown as transmitting and receiving messages include a user device 1502, a front end 1504, a call server 1506, a proxy server

1508, and a gateway 1510. Various messages to be set forth below may be transmitted or received by entities other than what is described. For example, the front end 1504, the call server 1506, and the proxy server 1508 may have lower level components or may be included within higher level components, some of which may be involved in the transmission of messages, according to alternative embodiments.

The user device 1502 transmits a call request 1512 to the front end 1504. The call request 1512 may include a phone number and a user identification code, for example, transmitted via a TCP/IP connection. ("TCP/IP" refers to Transmission Control Protocol/Internet Protocol. TCP is described in J. Postel, ed. "Transmission Control Protocol," IETF RFC 793, and IP is described in J. Postel, ed., "Internet Protocol," IETF RFC 791, September 1981, both of which are incorporated by reference herein.)

The front end 1504 makes a call server selection 1514. In the method 1500, the front end 1504 has selected the call server 1506.

The call server 1506 determines whether the call request 1512 from the user device 1502 is valid, which may include determining whether the user identification code and/or the phone number to be dialed are authorized under the user's call plan. If the call request 1512 is not valid, then the call server 1506 may transmit a rejection message 1516 to the user device 1502. If the call request 1512 is valid, then the call server 1506 registers the user device 1502 with the proxy server 1508, as shown in 1518.

The proxy server 1508 makes a gateway selection 1520, and transmits a network address (e.g. an IP address) to the call server 1506, as shown in 1522. In the method 1500, the proxy server 1508 has selected the gateway 1512.

The call server 1506 transmits branding information and an appropriate IP address (which may depend upon which embodiment is implemented) to the user device 1502, as shown in 1524.

The call server 1506 transmits call setup information 1526 to the gateway 1510 to initiate the call, and the gateway 1510 may transmit a call acceptance message 1528 back to the call server 1506.

The call server 1506 may transmit a call status indicator 1530 to the user device 1502, and a call notification 1532 may be issued from the gateway 1510 to the user device 1502, depending on the particular embodiment implemented. A call 1534 is established. Media for the call is preferably transmitted as RTP (Real-time Transport Protocol) over UDP (User Datagram Protocol). RTP is described in Schulzrinne et al., "RTP: A Transport Protocol for Real-Time Applications," IETF RFC 1889, January 1996, and UDP is described in Postel, "User Datagram Protocol," RFC 768, August 1980, both of which are incorporated by reference herein.

While the call 1534 is in process, the call server 1506 may be in communication 1536 with the gateway 1510 to monitor the call 1534. The call monitoring may include periodic pings, call quality, and error detection, and is preferably conducted using the native protocol of the gateway 1510.

As was discussed above, a disconnect 1538 may be initiated by either party.

Figure 16:
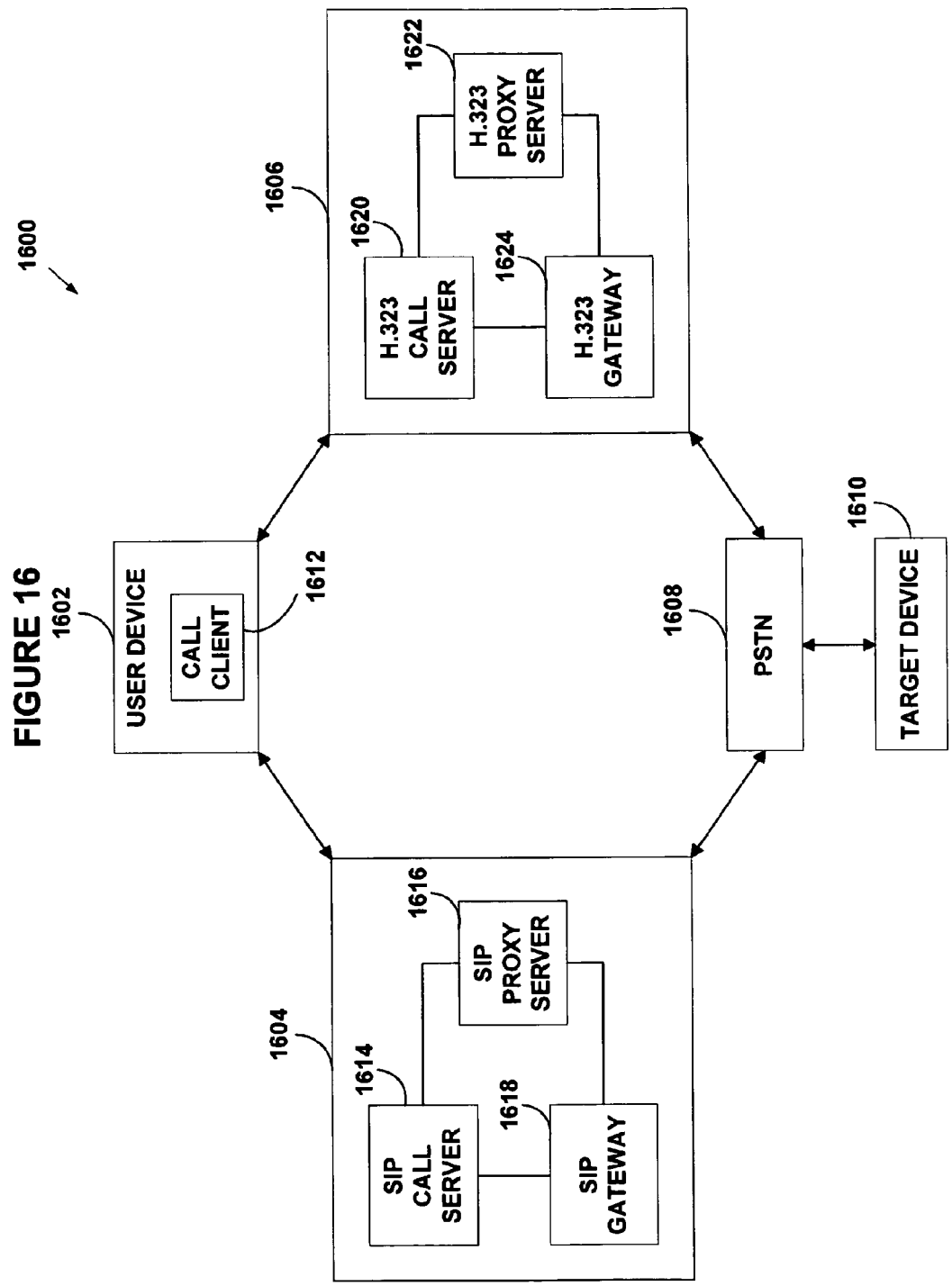
FIG. 16 is a simplified block diagram illustrating an exemplary system for allocating assets to a particular telephony protocol.

FIG. 16 is a simplified block diagram showing an exemplary system 1600 allocating assets to a particular telephony protocol. Although the SIP and H.323 protocols are illustrated in FIG. 16, other numbers and types of protocols may alternatively be employed. The system 1600 includes a user device 1602, assets assigned to the SIP protocol 1604, assets assigned to the H.323 protocol 1606, a PSTN 1608, and a target device 1610. The user device 1602 includes a call client 1612. The assets assigned to the SIP protocol 1604 include a SIP call server 1614, a SIP proxy server 1616, and a SIP gateway 1618. The assets assigned to the H.323 protocol 1606 include an H.323 call server 1620, an H.323 proxy server 1622, and an H.323 gateway 1624.

The user device 1602 may communicate to the assets assigned to a particular protocol based on the prefix in a phone number to be called. Other selection criteria may also be employed. If a particular telephony protocol is updated, only the call server(s) implementing that protocol is required to implement the update.

Figure 17:
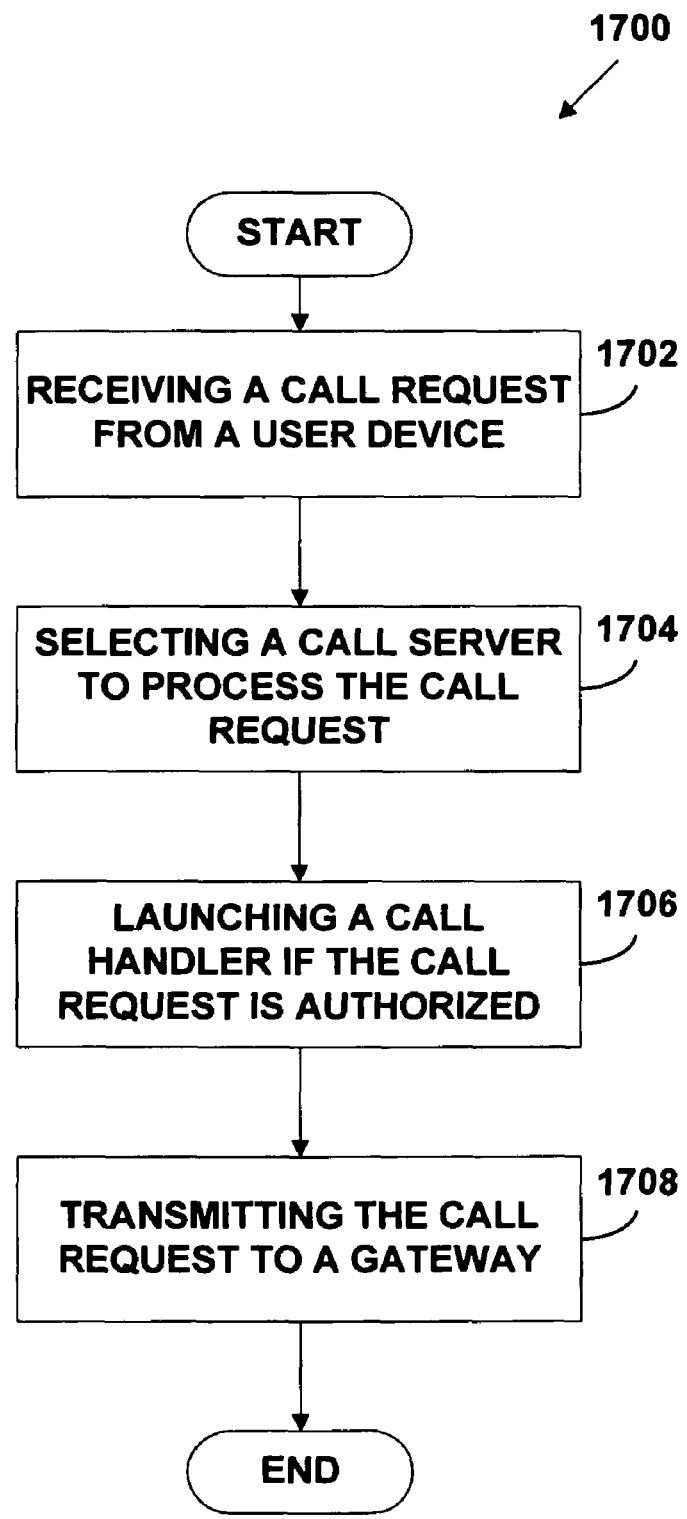
FIG. 17 is a simplified flow diagram illustrating an exemplary method for providing packet-switched telephony service.

FIG. 17 is a flow diagram illustrating a method 1700 for providing packet-switched telephony service, according to an exemplary embodiment. The method 1700 includes receiving a call request from a user device 202, as shown in 1702. The call request includes a target indicator of a target device 212 that the user device 202 is attempting to call. For example, the target indicator may include a telephone number corresponding to the target device 212. The call request received from the user device 202 is formatted and/or received according to a non-native protocol. In 1704, a call server 600 is selected to process the call request. The call server 600 may include a call director 700 operable to determine whether the call request is authorized. In 1706, a call handler 800 is launched upon determining that the call request is authorized. The call handler 800 may include a call master 802 and a call slave 804, as described above. The call master 802 receives the call request in the non-native protocol, and the call handler 800 converts the call request to a native protocol. In 1708, the call request is transmitted in the native protocol to a gateway 208. The gateway 208 implements the native protocol, and is operable to forward the call request to the target device 212. Other functionality may also be included as part of the method 1700. For example, the method 1700 may further include selecting the gateway 208 from a plurality of gateways based on at least one gateway selection criterion. Similarly, functionality described above with respect to FIGS. 1-16 may also be implemented.

Figure 18:
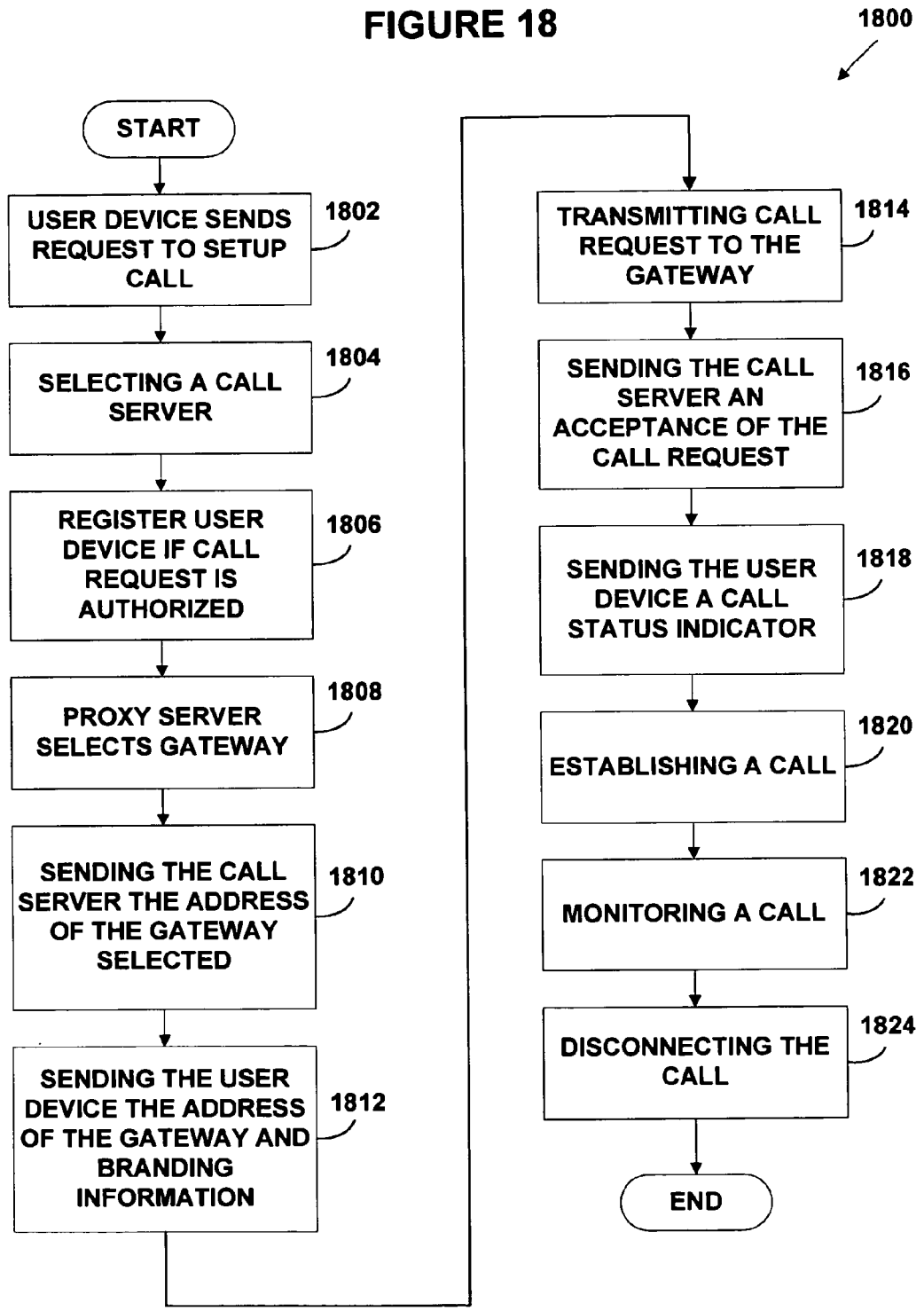
FIG. 18 is a simplified flow diagram illustrating an exemplary method for providing packet-switched telephony service.

FIG. 18 is a flow diagram illustrating a method 1800 for providing packet-switched telephony service, according to another exemplary embodiment. In 1802, a call request is received from a user device 202. The call request may include a target identifier, such as a telephone number corresponding to a target device 212. The call request is in accordance with a non-native protocol. In 1804, a call server 600 is selected to process the call request. The call server 600 includes a call director 700 operable to determine whether the call request is authorized. In 1806, the user device 202 is registered with a proxy server 1100 upon determining that the call request is authorized. The proxy server 1100 may include a registration data base 1102, for example, to assist in determining authorization. In 1808, a gateway 208 is selected by the proxy server 1100. The proxy server 1100 may, for example, periodically obtain a gateway status, and may maintain a gateway database 1104. In 1810, a network address corresponding to the selected gateway 208 is sent to the call server 600 by the proxy server 1100. In 1812, the user device 202 is sent the network address of the selected gateway 208. This information is preferably sent in a non-native protocol. In an alternative embodiment, branding information and/or advertising information may also be sent to the user device by the call server 600 at this time. In 1814, the call request is transmitted in a native protocol to the gateway 208, which operates according to the native protocol. The gateway 208 is operable to forward the call request to the target device 212, such as via a Public-Switched Telephone Network (PSTN) 210. At 1816, the gateway 208 sends the call server 600 an acceptance of the call request, preferably in the native protocol. In 1818, the call server 600 sends the user device 202 a call status indicator, preferably in the non-native protocol. In 1820, a call is established between the user device 202 and the gateway 208. This may include the gateway 208 notifying the user device 202 (such as by notification message) that the call is established. The method 1800 may include additional functionality. For example, the call may be monitored by the call server 600 as in 1822. As another example, disconnect service may be provided by detecting a disconnect indicator (such as a hang-up by the target device 212 or a similar notification by the user device 202) and performing an appropriate disconnect action as in 1824. Such a disconnect action may be performed by the gateway 208 or the PSTN 210 in the case of the target device 212, or by the call server 600 in the case of the user device 202.

Figure 19:
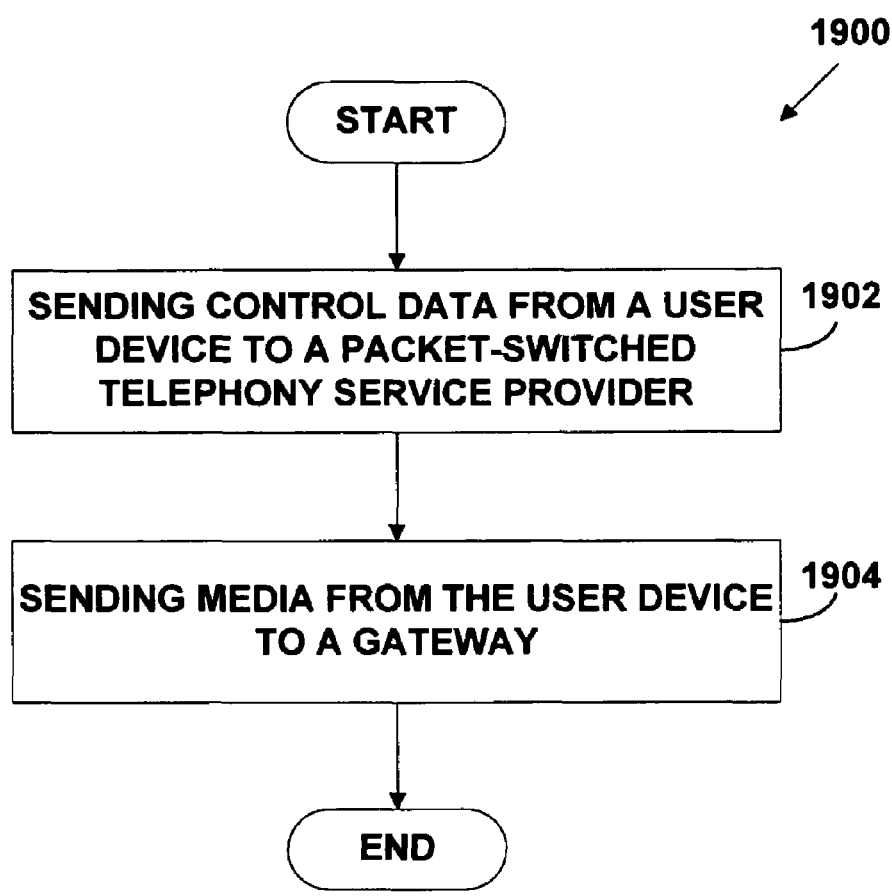
FIG. 19 is a simplified flow diagram illustrating an exemplary method for providing packet-switched telephony service.

FIG. 19 is a flow diagram illustrating a method 1900 for providing packet-switched telephony service, according to yet another exemplary embodiment. In 1902, call control data is sent from a user device 202 to a PTSP 400. The call control data may, for example, include a call request, ping information, and/or disconnect request information. The call control data is preferably included in at least one packet including a first network address specification, such as an IP address corresponding to the PTSP 400. Such call control data may be sent by the PTSP 400 to a gateway 208 according to a protocol that is native to the gateway 208. In 1904, the user device 202 sends media to a gateway 208, so that the gateway 208 may forward the media to a target device 212. The media may include, but is not limited to, voice data. The media is preferably sent from the user device 202 to the gateway 208 according to a native protocol, and preferably consists of at least one packet including a network address specification such as an IP address corresponding to the gateway 208.

FIG. 20 is a flow diagram illustrating a method 2000 for providing packet-switched telephony service, according to still yet another embodiment. In 2002, call control data and media are sent from a user device 202 to a PTSP 400 according to a non-native protocol. In 2004, the call control data and media are sent from the PTSP 400 to the gateway 208 according to a native protocol supported by the gateway 208. The gateway 208 may be further operable to forward the media to a target device 212. Much of the functionality described with reference to FIGS. 17-19 may also be included in the method 2000. In addition, functionality described with reference to FIGS. 1-16 may also be implemented.

In view of the wide variety of embodiments to which the principles of the invention can be applied, it should be understood that the illustrated embodiments are exemplary only, and should not be taken as limiting the scope of the present invention. For example, more or fewer elements or components may be used in the block diagrams. In addition, the present invention can be practiced with hardware or a combination of software and hardware.

We claim:

1. A method comprising:
registering a user device with a packet switched telephony service provider (PTSP);
receiving a call request at the PTSP according to a non-native protocol from the user device, wherein the non-native protocol is non-native to a gateway and the call request includes a telephone number corresponding to a public-switched telephone network (PSTN) subscriber;
translating the call request from the non-native protocol to a native protocol that is native to the gateway and prior to transmitting the call request to the gateway;
transmitting the translated call request from the PTSP to the gateway according to the native protocol, wherein the gateway forwards the call request to the PSTN subscriber;
causing a call to be established between the user device and the PSTN subscriber;
sending media data for the call between the user device and the PSTN subscriber via a first communication channel; and
sending call control data for the call via a second communication channel different than the first communication channel, the call control data including call ping data sent while the call is in progress.

2. The method of claim 1, further comprising selecting an advertisement to be transmitted to the user device based on at least one of an identity of the user device or a time of day.

3. The method of claim 1, wherein said receiving the call request occurs in response to a selection of an address book entry corresponding to the PSTN subscriber.

4. The method of claim 1, wherein the gateway has a network address on the Internet.

5. The method of claim 1, wherein the native protocol is selected from H.323, SIP, or MGCP.

6. The method of claim 1, wherein the user device is a device selected from the group consisting of a personal computer, a mobile phone, a wireless handheld, or a packet-switched telephone.

7. The method of claim 1, further comprising selecting the gateway from a plurality of gateways.

8. The method of claim 1, further comprising logging information about calls from the user device.

9. The method of claim 1, further comprising transmitting media between the user device and the gateway according to User Datagram Protocol.

10. The method of claim 1, wherein the PTSP transmits the call request to a proxy server.

11. The method of claim 10, wherein the proxy server selects the gateway.

12. The method of claim 10, wherein the proxy server includes a gateway database.

13. The method of claim 1, wherein the non-native protocol comprises hypertext transfer protocol (HTTP) packets.

14. The method of claim 1, wherein the gateway transmits media and call control packets to the PTSP, and wherein the PTSP transmits the media and call control packets to the user device.

15. The method of claim 1, further comprising receiving from a user associated with the user device an agreement to receive advertisements in exchange for receiving telephony service.

16. The method of claim 1, further comprising transmitting a call status indicator to the user device.

17. The method of claim 1, wherein the PTSP mixes audio for a plurality of user devices to enable conference calling among the plurality of user devices.

18. A system comprising:
one or more processors; and
hardware storing software that is executable by the one or more processors to perform operations including:
registering a user device with a packet switched telephony service provider (PTSP);
receiving a call request from the user device, wherein the call request is received in a non-native protocol that is non-native to a gateway and includes a telephone number corresponding to a public-switched telephone network (PSTN) subscriber;

translating the call request from the non-native protocol to a native protocol that is native to the gateway, said translating being performed prior to transmitting the call request to the gateway;

transmitting the translated call request in the native protocol to the gateway, wherein the gateway forwards the call request to the PSTN subscriber;

transmitting media data for a call between the user device and the PSTN subscriber between the user device and the gateway according to User Datagram Protocol and via a first communication channel; and transmitting control data for the call between the user device and the PTSP via a second communication channel different than the first communication channel, the control data including ping data for the call sent while the call is in progress.

19. The system of claim 18, wherein the operations further include selecting an advertisement to be transmitted to the user device based on at least one of an identity of the user device or a time of day.

20. The system of claim 18, wherein said receiving the call request occurs in response to a selection of an address book entry corresponding to the PSTN subscriber.

21. The system of claim 18, wherein the gateway has a network address on the Internet.

22. The system of claim 18 wherein the call request is transmitted in a non-native protocol from the user device to the PTSP.

23. The system of claim 22, wherein the PTSP communicates with the gateway according to a native protocol.

24. The system of claim 18, wherein the native protocol is selected from H.323, SJP, or MGCP.

25. The system of claim 18, wherein the user device is a device selected from the group consisting of a personal computer, a mobile phone, a wireless handheld, or a packet-switched telephone.

26. The system of claim 18, wherein the operations further include selecting the gateway from a plurality of gateways.

27. The system of claim 18, wherein the operations further include logging information about calls from the user device.

28. The system of claim 18, wherein the PTSP transmits the call request to a proxy server.

29. The system of claim 28, wherein the proxy server selects the gateway.

30. The system of claim 28, wherein the proxy server includes a gateway database.

31. The system of claim 18, wherein the user device transmits the call request in the native protocol to the PTSP.

32. The system of claim 18, wherein the gateway transmits media and call control packets to the PTSP, and wherein the PTSP transmits the media and call control packets to the user device.

33. The system of claim 18, wherein the operations further include receiving from a user associated with the user device an agreement to receive advertisements in exchange for receiving telephony service.

34. The system of claim 18, wherein the operations further include transmitting a call status indicator to the user device.

35. The system of claim 18, wherein the PTSP mixes audio for a plurality of user devices to enable conference calling among the plurality of user devices.

36. A method comprising:
authenticating a user device with a packet switched telephony service provider (PTSP);

formatting a call request according to a protocol selected from Basic Encoding Rules (BER) and Packed Encoding Rules (PER), wherein the call request includes a telephone number for a different user device;

sending a message through the Internet via a first communication channel to the PTSP, wherein the message includes the call request, an IP address, and a port number to transmit data to the user device;

causing a call to be established between the user device and the different user device;

sending media via a second communication channel different than the first communication channel from the user device through the Internet as part of the call; and sending call control data for the call via the first communication channel from the user device to the PTSP, the call control data including call ping data that is sent via the first communication channel to the PTSP after the call is established.

37. The method of claim 36, wherein the user device is a device selected from the group consisting of a personal computer, a mobile phone, a wireless handheld, or a packet-switched telephone.

38. The method of claim 36, further comprising receiving an "unauthorized" message at the user device if the user does not have a sufficient balance to place the call.

39. The method of claim 36, wherein the user device is operable to accept a selection of an address book entry corresponding to a Public-Switched Telephone Network (PSTN) subscriber that corresponds to the different user device.

40. The method of claim 36, further comprising receiving a call status indicator at the user device.

41. The method of claim 36, wherein media and call control packets transmitted from the user device have the same destination address.

42. The method of claim 36, further comprising receiving advertisements at the user device.

43. The method of claim 42, wherein the advertisements are selected based on an advertisement selection criterion selected from the group consisting of user device and time of day.

44. The method of claim 36, wherein the user device transmits the call request to the PTSP via hypertext transfer protocol (HTTP).

45. The method of claim 36, wherein the message is formatted according to a protocol selected from UDP (User Datagram Protocol) and TCP (Transmission Control Protocol).

46. The method of claim 36, further comprising sending media as part of the call from the user device according to User Datagram Protocol.

47. The method of claim 36, wherein the user device includes a telephony client application that includes a port scan module.

* * * * *